United States Patent
Radic

(10) Patent No.: US 11,005,364 B1
(45) Date of Patent: May 11, 2021

(54) FREQUENCY JITTER UTILIZING A FRACTIONAL VALLEY SWITCHING CONTROLLER

(71) Applicant: Silanna Asia Pte Ltd, Singapore (SG)

(72) Inventor: Aleksandar Radic, Toronto (CA)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 16/719,335

(22) Filed: Dec. 18, 2019

(51) Int. Cl.
*H02M 1/44* (2007.01)
*H02M 7/217* (2006.01)
*H02M 1/08* (2006.01)
*H02M 1/088* (2006.01)
*H02M 3/335* (2006.01)
*H02M 1/32* (2007.01)

(52) U.S. Cl.
CPC ............ *H02M 1/44* (2013.01); *H02M 7/2176* (2013.01); *H02M 1/08* (2013.01); *H02M 1/088* (2013.01); *H02M 1/32* (2013.01); *H02M 3/335* (2013.01); *H02M 3/33507* (2013.01); *H02M 3/33546* (2013.01); *H02M 3/33592* (2013.01)

(58) Field of Classification Search
CPC ........ H02M 1/44; H02M 7/2176; H02M 1/08; H02M 1/088; H02M 1/32; H02M 3/335; H02M 3/33507; H02M 3/33546; H02M 3/33592
See application file for complete search history.

(56) References Cited

U.S. PATENT DOCUMENTS

| | | | |
|---|---|---|---|
| 5,173,846 | A | 12/1992 | Smith |
| 5,206,800 | A | 4/1993 | Smith |
| 5,434,767 | A | 7/1995 | Batarseh et al. |
| 5,636,106 | A | 6/1997 | Batarseh et al. |

(Continued)

FOREIGN PATENT DOCUMENTS

| | | |
|---|---|---|
| CN | 1736018 A | 2/2006 |
| CN | 101277061 A | 10/2008 |

(Continued)

OTHER PUBLICATIONS

Office Action dated Aug. 31, 2020 for Chinese Patent application No. 201780062234.0.

(Continued)

*Primary Examiner* — Kyle J Moody
*Assistant Examiner* — Lakaisha Jackson
(74) *Attorney, Agent, or Firm* — MLO, a professional corp.

(57) ABSTRACT

A method involves determining a target number of valleys of a resonant waveform at a drain node of a main switch of a power converter. The target number of valleys corresponds to a desired off-time of the main switch. A first intermediate valley number of a series of intermediate valley numbers is selected. An average of the series of intermediate valley numbers corresponds to the target number of valleys. A first average off-time of the main switch is controlled, for a duration of a first modulation period, such that the first average off-time corresponds to the first intermediate valley (Continued)

number. Upon expiration of the first modulation period, a second intermediate valley number of the intermediate valley numbers is selected. A second average off-time of the main switch is controlled, for a duration of a second modulation period, such that the second average off-time corresponds to the second intermediate valley number.

22 Claims, 19 Drawing Sheets

(56) References Cited

U.S. PATENT DOCUMENTS

| | | |
|---|---|---|
| 6,341,073 B1 | 1/2002 | Lee |
| 6,421,256 B1 | 7/2002 | Giannopoulos et al. |
| 7,791,909 B2 | 9/2010 | Koo et al. |
| 7,876,085 B2 | 1/2011 | Hung et al. |
| 8,259,471 B2 | 9/2012 | Li et al. |
| 8,339,817 B2 | 12/2012 | Halberstadt |
| 8,552,893 B1 | 10/2013 | Sood et al. |
| 8,659,237 B2 | 2/2014 | Archenhold |
| 8,659,915 B2 | 2/2014 | Tsui |
| 8,755,203 B2 | 6/2014 | Li et al. |
| 9,083,250 B2 | 7/2015 | Adragna |
| 9,154,030 B2 | 10/2015 | Bianco et al. |
| 9,602,006 B2 | 3/2017 | Fahlenkamp |
| 9,825,535 B2 | 11/2017 | Teo et al. |
| 9,991,791 B2 | 6/2018 | Herfurth et al. |
| 10,224,828 B1 | 3/2019 | Sigamani et al. |
| 10,367,422 B1* | 7/2019 | Malinin ............ H02M 3/33523 |
| 10,439,499 B2 | 10/2019 | Radic et al. |
| 10,461,627 B2 | 10/2019 | Radic |
| 2006/0061343 A1 | 3/2006 | Lipcsei et al. |
| 2008/0112193 A1 | 5/2008 | Yan et al. |
| 2009/0231894 A1 | 9/2009 | Moon et al. |
| 2009/0296429 A1 | 12/2009 | Cook et al. |
| 2010/0026208 A1 | 2/2010 | Shteynberg et al. |
| 2010/0315838 A1 | 12/2010 | Mao et al. |
| 2011/0031949 A1 | 2/2011 | Zhang et al. |
| 2011/0182089 A1 | 7/2011 | Berghegger |
| 2012/0002449 A1 | 1/2012 | Park et al. |
| 2012/0039098 A1 | 2/2012 | Berghegger |
| 2013/0121049 A1 | 5/2013 | Shi et al. |
| 2013/0154495 A1 | 6/2013 | He |
| 2013/0245854 A1 | 9/2013 | Rinne et al. |
| 2013/0329468 A1 | 12/2013 | Yang |
| 2014/0003098 A1 | 1/2014 | Park et al. |
| 2014/0112030 A1 | 4/2014 | Fahlenkamp |
| 2014/0268913 A1 | 9/2014 | Zheng et al. |
| 2015/0103566 A1 | 4/2015 | Keogh et al. |
| 2015/0155786 A1 | 6/2015 | Shen et al. |
| 2015/0229200 A1 | 8/2015 | Schwartz |
| 2015/0236597 A1 | 8/2015 | Hinz et al. |
| 2015/0249389 A1 | 9/2015 | Cummings |
| 2017/0047846 A1 | 2/2017 | Teo et al. |
| 2017/0054374 A1* | 2/2017 | Fang ................. H02M 3/33523 |
| 2017/0085183 A1 | 3/2017 | Notsch |
| 2017/0187292 A1 | 6/2017 | Schaemann et al. |
| 2018/0062529 A1 | 3/2018 | Song et al. |
| 2018/0083538 A1* | 3/2018 | Kong ................. H02M 3/33523 |
| 2018/0153013 A1 | 5/2018 | Halim et al. |
| 2018/0166993 A1 | 6/2018 | Hsu et al. |
| 2018/0269793 A1 | 9/2018 | Ahsanuzzaman et al. |
| 2019/0006935 A1* | 1/2019 | Wang ................. H02M 3/33523 |
| 2019/0058450 A1 | 2/2019 | Jun et al. |
| 2019/0252966 A1 | 8/2019 | Radic |

FOREIGN PATENT DOCUMENTS

| | | |
|---|---|---|
| KR | 20130054212 A | 5/2013 |
| KR | 20130105537 A | 9/2013 |
| WO | 2017074305 A1 | 5/2017 |

OTHER PUBLICATIONS

International Search Report and Written Opinion dated Jan. 15, 2018 for PCT Patent Application No. PCT/CA2017/051207.
International Search Report dated May 21, 2019 for PCT Patent Application No. PCT/IB2019/051092.
Notice of Allowance dated Jun. 19, 2019 for U.S. Appl. No. 16/269,931.
Notice of Allowance dated May 31, 2019 for U.S. Appl. No. 16/020,496.
Office Action dated Mar. 6, 2019 for U.S. Appl. No. 16/020,496.
Office Action dated Apr. 13, 2020 for U.S. Appl. No. 16/665,188.
Notice of Allowance dated Aug. 20, 2020 for U.S. Appl. No. 16/665,188.
Office Action dated Feb. 17, 2021 for U.S. Appl. No. 16/595,026.

* cited by examiner

FIG. 16
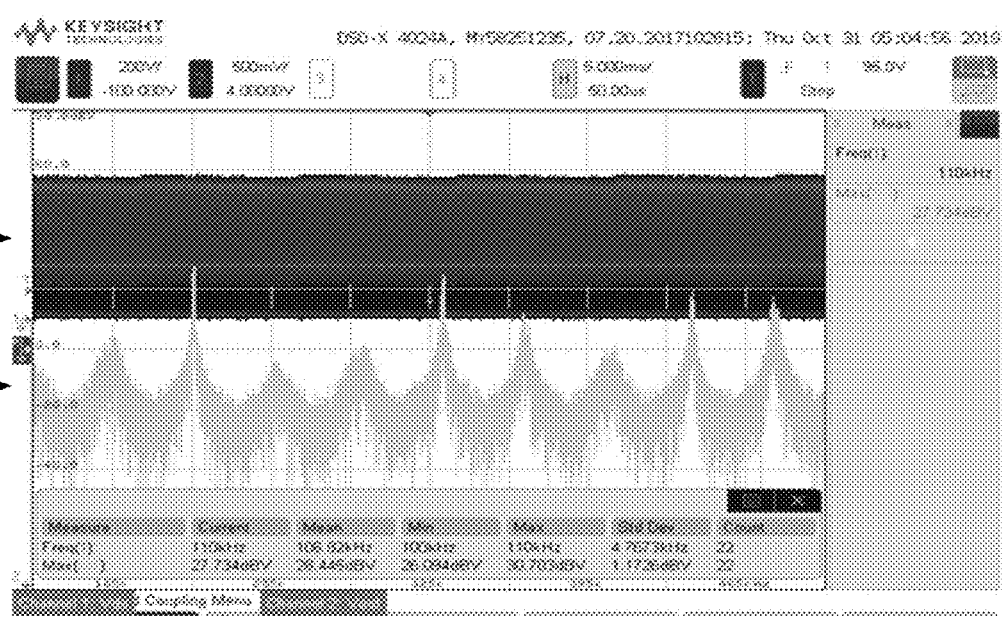
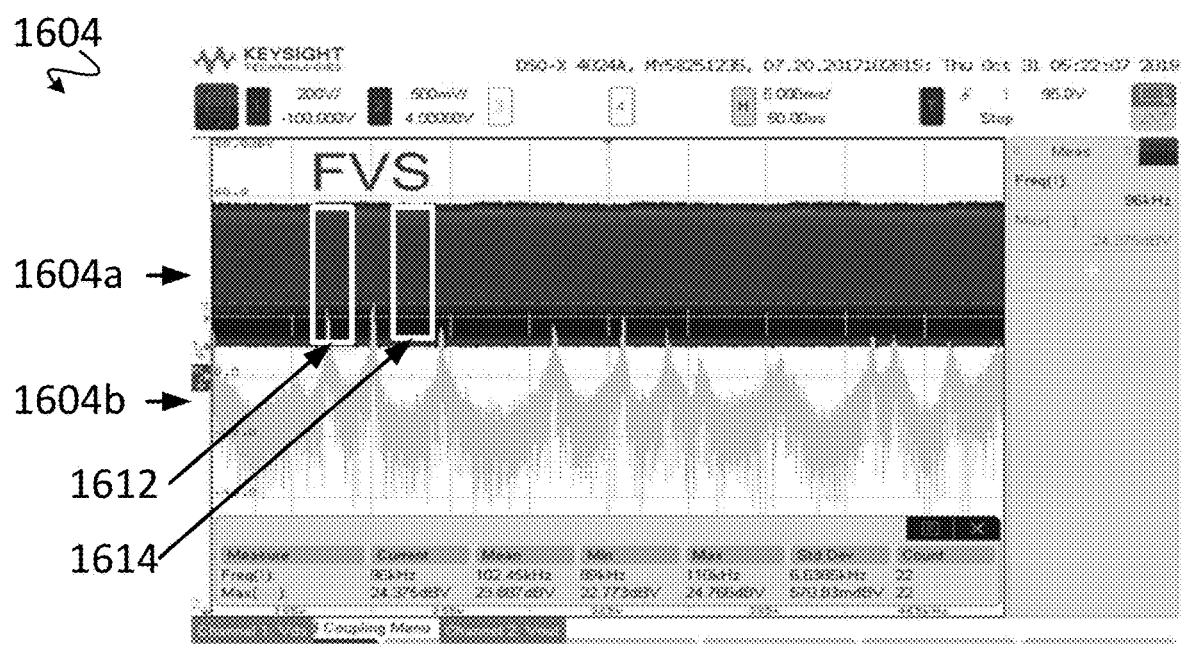

FIG. 17
1702
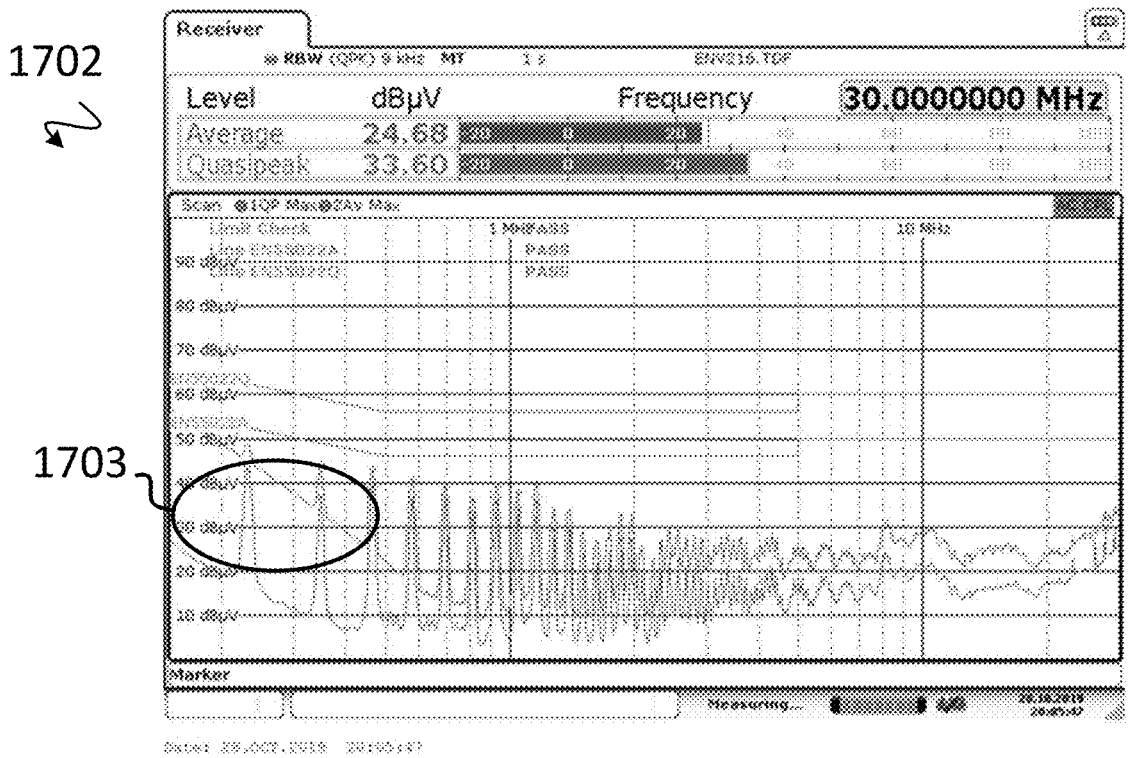
1703
1704
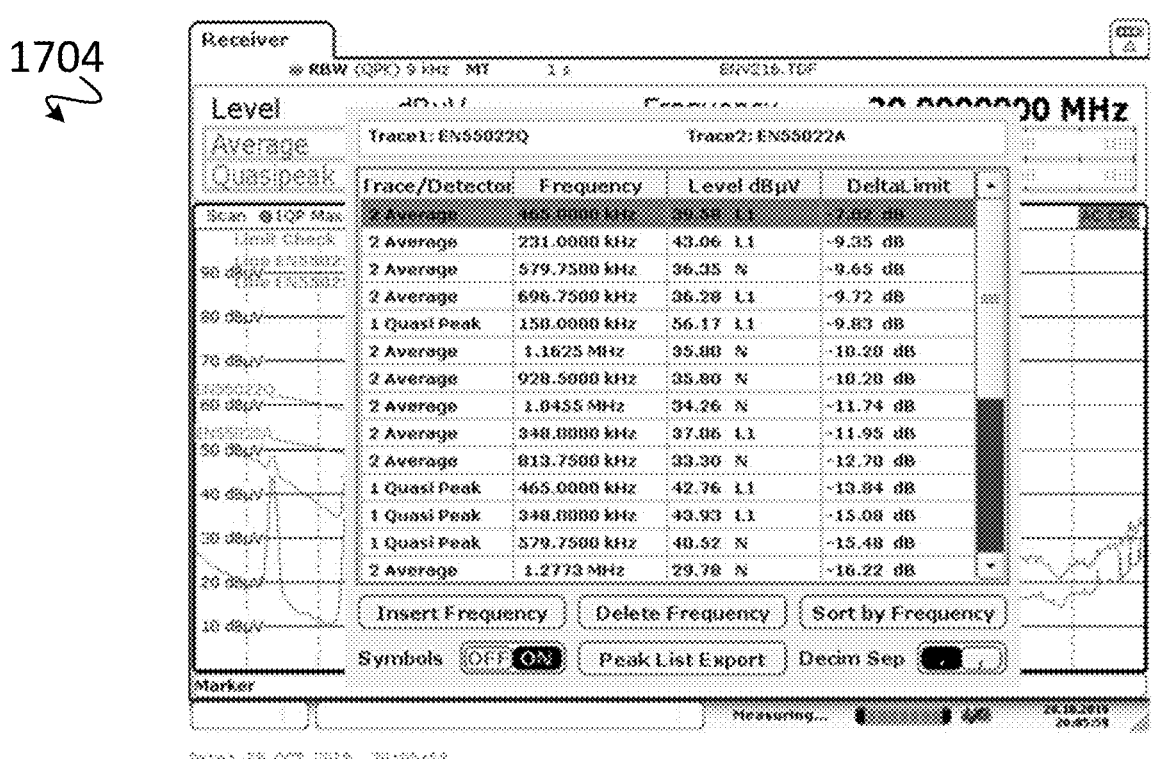

FIG. 18
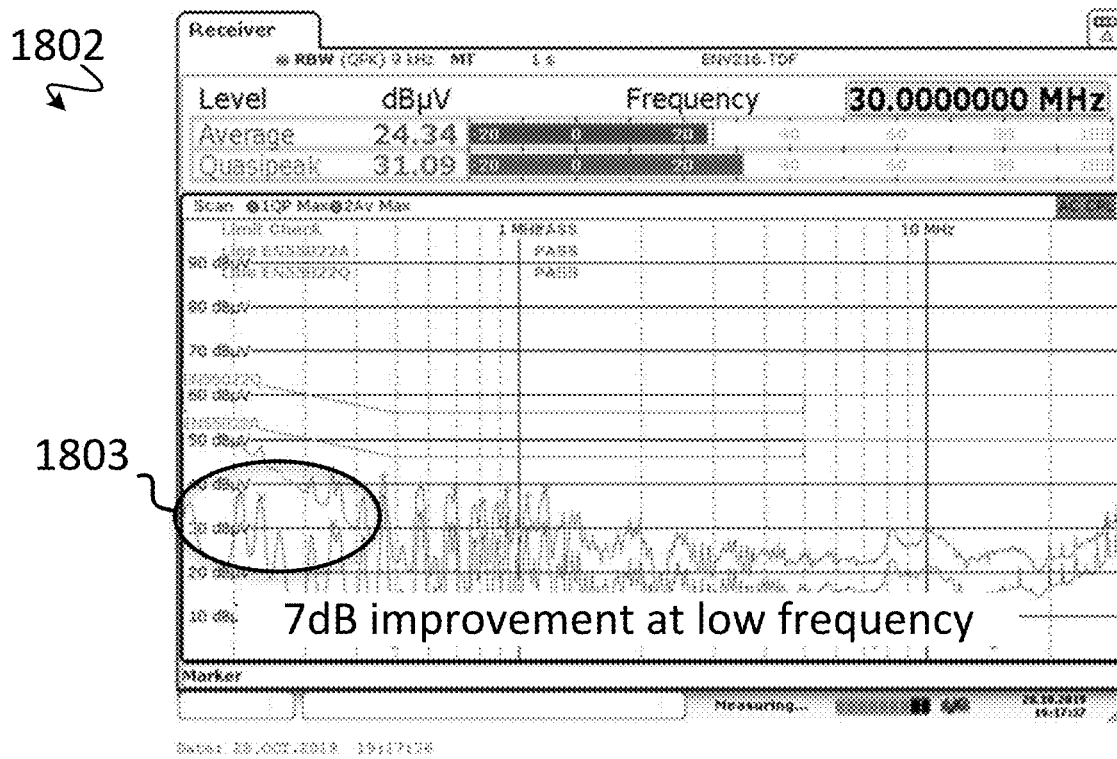
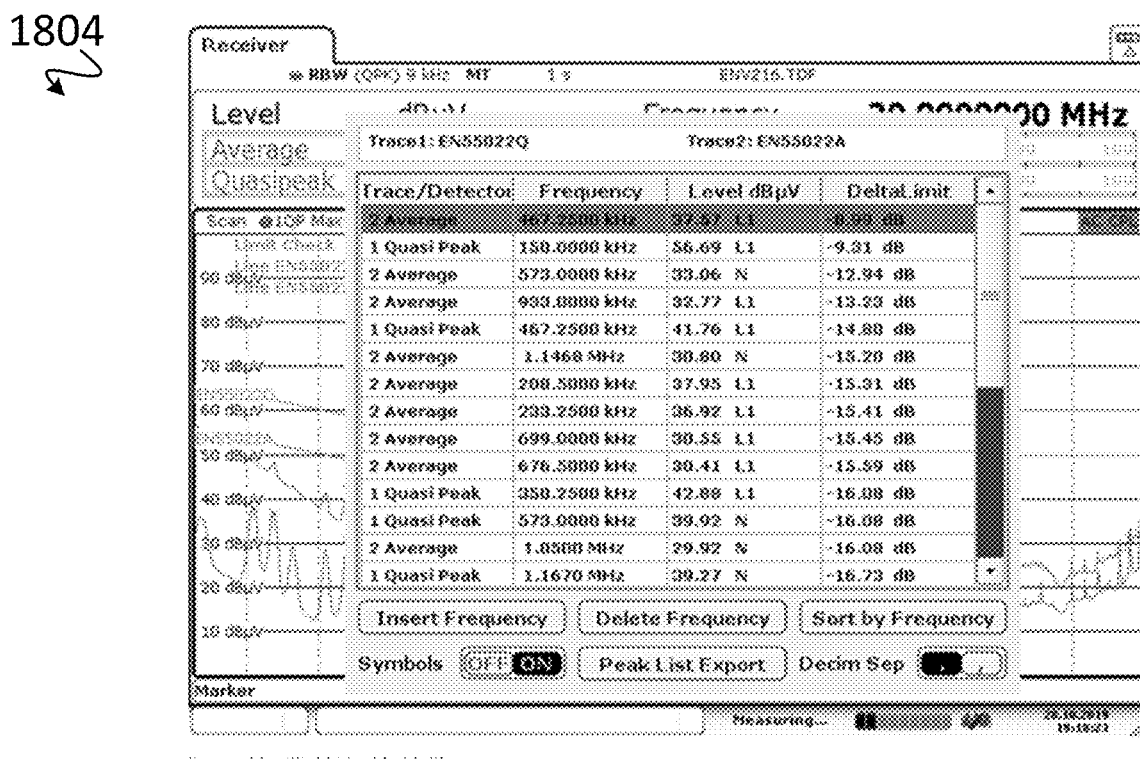

FREQUENCY JITTER UTILIZING A FRACTIONAL VALLEY SWITCHING CONTROLLER

RELATED APPLICATIONS

This application is related to U.S. Pat. No. 10,461,627, issued on Oct. 29, 2019, and entitled "Fractional Valley Switching Controller," and U.S. Pat. No. 10,439,499, issued on Oct. 8, 2019, and entitled "Switch-Mode Power Supply Controller"; all of which are hereby incorporated by reference in their entirety for all purposes.

BACKGROUND

Switch-mode power supplies (SMPSs) ("power converters") are widely utilized in consumer, industrial, and medical applications to provide well-regulated power while maintaining high power processing efficiency, tight-output voltage regulation, and reduced conducted and radiated electromagnetic interference (EMI).

To meet these conflicting goals, state-of-the-art power converters (fly-back converters, forward converters, boost converters, buck converters, and so on) commonly utilize quasi-resonant control methods. Quasi-resonant control methods induce a resonant waveform having sinusoidal voltage oscillations at the drains of one or more semiconductor switches of the power converter. Through well-timed control actions, the semiconductor switches are turned on at the instants where the drain voltage is at a minimum (i.e., valley switching), thus minimizing the semiconductor switching losses and drain-source dv/dt slope, leading to increased power processing efficiency and reduced electromagnetic interference (EMI).

One approach to reducing conducted EMI involves introducing a switching frequency jitter for a primary-side switch (i.e., a "main switch") of the power converter to spread an average conducted EMI across a range of frequencies, thereby reducing a peak conducted EMI energy level for any given single frequency. Conventionally, the switching frequency of the main switch is jittered such that the switching frequency varies over time, either randomly, pseudo-randomly, or in accordance with a predefined pattern such a triangular, sinusoidal, or exponential pattern. In such a way, a desired frequency bandwidth is achieved. For switching frequency jitter to be effective, the switching frequency of the main switch may be varied, for example, such that a switching frequency spectrum is distributed equally in as many 9 kHz bandwidth segments as possible to achieve meaningful peak conducted EMI energy reduction at any given single frequency. For example, if the switching frequency of the main switch is varied slowly using a triangular wave such that the variation is 9 kHz, then no average conduction EMI reduction would be achieved. Thus, in order to achieve a significant benefit, the switching frequency of the main switch may be varied at 18 kHz such that the switching frequency spectrum is modulated between two 9 kHz bands. One downside to this approach is that power processing efficiency of the power converter may deteriorate significantly at a maximum power output of the power converter due to such a wide, non-optimal, switching frequency variation which forces the power converter to use a lower than desired switching frequency. Conversely, if the switching frequency of the main switch is varied quickly and abruptly between a set of fixed switching frequencies, an audible tone at a frequency that the human ear is sensitive to may be introduced.

SUMMARY

In some embodiments, a method involves determining a target number of valleys of a resonant waveform at a drain node of a main switch of a power converter. The target number of valleys corresponds to a desired off-time of the main switch. A first intermediate valley number of a series of intermediate valley numbers is selected. An average of the series of intermediate valley numbers corresponds to the target number of valleys. For a duration of a first modulation period, a first average off-time of the main switch is controlled such that the first average off-time of the main switch corresponds to the first intermediate valley number. Upon expiration of the first modulation period, a second intermediate valley number of the series of intermediate valley numbers is selected. A difference of the second intermediate valley number and the first intermediate valley number is equal to a fractional valley number offset. For a duration of a second modulation period, a second average off-time of the main switch is controlled such that the second average off-time of the main switch corresponds to the second intermediate valley number.

In some embodiments, a power converter controller includes a fractional valley controller configured to determine a target number of valleys of a resonant waveform at a drain node of a main switch of a power converter. The target number of valleys corresponds to a desired off-time of the main switch. The power converter controller includes a valley jitter module configured to select a first intermediate valley number of a series of intermediate valley numbers. An average of the series of intermediate valley numbers corresponds to the target number of valleys. The main switch is controlled for a duration of a first modulation period such that a first average off-time of the main switch corresponds to the first intermediate valley number. The valley jitter module is configured to select, upon expiration of the first modulation period, a second intermediate valley number of the series of intermediate valley numbers. A difference of the second intermediate valley number and the first intermediate valley number is equal to a fractional valley number offset. The main switch is controlled for the duration of a second modulation period such that a second average off-time of the main switch corresponds to the second intermediate valley number.

BRIEF DESCRIPTION OF THE DRAWINGS

FIG. 16 shows screenshots of experimental results for a power converter that is similar to the power converter shown in FIG. 2, in accordance with some embodiments.

FIG. 17 shows screenshots of experimental results for a power converter that is similar to the power converter shown in FIG. 2.

FIG. 18 shows screenshots of experimental results for a power converter that is similar to the power converter shown in FIG. 2, in accordance with some embodiments.

DETAILED DESCRIPTION

Figure 1:
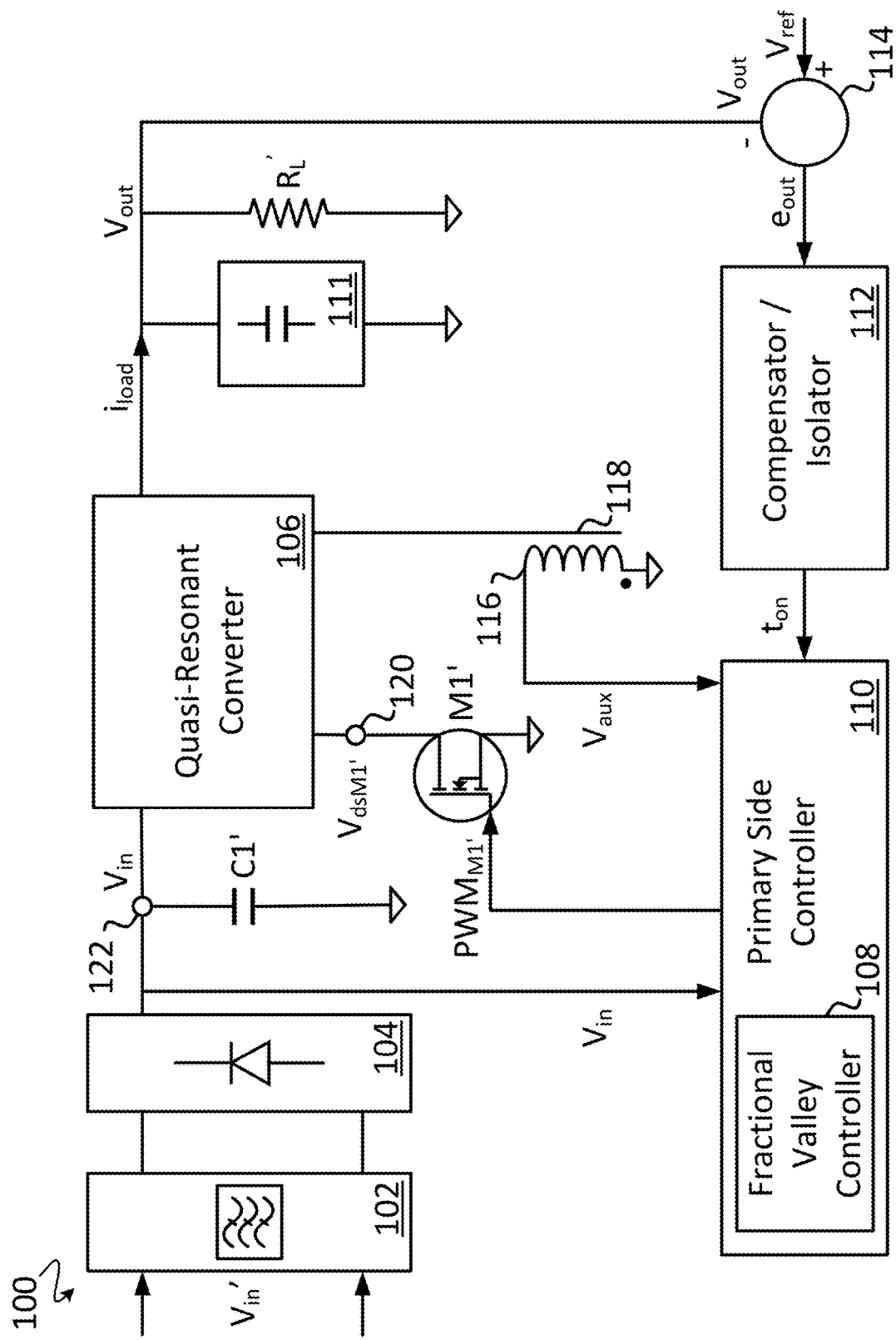
FIG. 1 is a simplified schematic of a power converter that implements fractional valley switching, in accordance with some embodiments.

Some embodiments described herein provide a fractional valley switching controller of a switch-mode power supply ("power converter") that implements fractional valley switching during a quasi-resonant operating mode of the power converter to reduce a peak electromagnetic interference (EMI) conducted by the power converter by spreading an average conducted EMI across a wide frequency range (e.g., across multiple 9 kHz frequency bands). In some embodiments, the fractional valley switching controller modulates, or "jitters," between a series of average off-times of a primary-side switch ("main switch") of the power converter to spread the average conducted EMI across the wide frequency range. Each modulated average off-time of the main switch corresponds to a respective intermediate valley number of a resonant waveform developed at a drain node of the main switch. An average of a series of the intermediate valley numbers is equal to a target valley number that corresponds to a desired off-time of the main switch. The fractional valley switching controller advantageously modulates between the average off-times of the main switch with a periodicity such that the modulation generates an audible tone that is within a frequency range that the human ear is significantly less sensitive to as compared to audible tones in a higher frequency range. By modulating the average off-time of the main switch rather than varying a switching frequency of the main switch, the average conducted EMI of the power converter is advantageously spread across a wide frequency band without a significant reduction in power processing efficiency of the power converter. Because an average of the modulated off-times of the main switch advantageously corresponds to a desired off-time or target valley of the main switch, the power converter is thereby operable to meet optimized operating criteria while still minimizing a peak conducted EMI for any given frequency. In some embodiments, one or more average off-times of the modulated average off-times of the main switch advantageously correspond to a non-integer (i.e., fractional) valley number, thereby further enabling the power converter to meet the optimized operating criteria.

In some embodiments, the fractional valley switching controller ("fractional valley controller") is part of a primary side controller of the power converter. In general, the power converter converts an input voltage on a primary side of a transformer to an output voltage on a secondary side of the transformer by controlling a current through a primary winding of the transformer using the main switch, i.e., a primary side switch. During the off-time of the main switch, a resonant waveform develops at the drain node of the main switch. Based on the off-time of the main switch, the resonant waveform includes one or more peaks (local maxima) and one or more valleys (local minima). The primary side controller of the power converter is configured to control the off-time of the main switch such that the main switch is typically only switched when the drain-source voltage of the main switch is at a local minimum (i.e., at a valley of the resonant waveform). Unfortunately, in some instances, a total power to be delivered by the power converter can correspond to a non-integer number of valleys. Because a non-integer valley number does not correspond to a local minimum of the resonant waveform, switching the main switch at a non-integer valley number will result in switching losses that are greater than if the main switch is switched when the drain-source voltage is at a local minimum (i.e., corresponding to an integer number of valleys). The fractional valley switching controller advantageously controls, by fractional valley switching, the off-time of the main switch such that the main switch is typically only switched at integer valleys but enables the power converter to still deliver a total power that corresponds to a non-integer number of valleys. Such fractional valley switching is accomplished by the fractional valley controller by modulating a series of off-times of the main switch, each of the modulated off-times corresponding to a respective integer number of valleys. An average of the modulated off-times converges to an off-time that corresponds to a non-integer (i.e., fractional) valley. Thus, advantageously, a precise amount of power is delivered by the power converter, and switching losses are still minimized, thereby meeting an optimized operating criteria.

Additionally, in some embodiments, the fractional valley controller disclosed herein advantageously enables or disables fractional valley switching based on a switching cycle frequency of the main switch to prevent undesirable audible tones. Still further, the fractional valley controller provides for a fractional resolution of the non-integer number of valleys that is greater than that provided by typical valley dithering techniques. In other embodiments, a series of off-times of the main switch are modulated to spread an average conducted EMI across a wide frequency band. In such embodiments, a modulation frequency may be advantageously selected such that an audible tone is of a frequency that the human ear is less sensitive to as compared to higher frequency audible tones.

FIG. 1 is a simplified circuit schematic of a power converter 100, in accordance with some embodiments. Some elements of the power converter 100 have been omitted from FIG. 1 to simplify the description of the power converter 100 but are understood to be present. In general, the power converter 100 includes an input voltage filter block 102, a rectifier block 104 (in the case of AC input), a quasi-resonant converter circuit 106, a fractional valley controller 108 of a primary side controller 110 (a "power converter controller"), an output buffer circuit 111, a compensator/isolator ("feedback network") 112, a signal difference block 114, an auxiliary winding 116 of a transformer 118 of the quasi-resonant converter circuit 106, an input voltage buffer capacitor C1', and a primary-side switch ("main switch") M1', coupled as shown. Also shown is a drain-source voltage $V_{dsM1}$, of the main switch M1' at a signal node 120, an input voltage $V_{in}$', a conditioned input voltage $V_{in}$ at a signal node 122, an auxiliary voltage $V_{aux}$, an output voltage $V_{out}$, an output current $i_{load}$, a feedback signal $t_{on}$, an error signal $e_{out}$, and a reference voltage $V_{ref}$.

The power converter 100 is configured to receive the input voltage $V_{in}$' and to provide the output voltage $V_{out}$ and the output current $i_{load}$ to a load $R_L$' based on an on-time and an off-time of the main switch M1'. The on-time and the off-time of the main switch M1' are controlled by the primary side controller 110. The primary side controller 110 is configured to receive the input voltage $V_{in}$, the auxiliary voltage $V_{aux}$, and a feedback signal (e.g., a magnetizing inductance charging time $t_{on}$, or other feedback signal) and to generate a main switch control signal $PWM_{M1}$, to control the on-time and off-time of the main switch M1'. In some embodiments, the quasi-resonant converter circuit 106 is implemented as a fly-back, forward, boost, or buck power converter.

Figure 2:
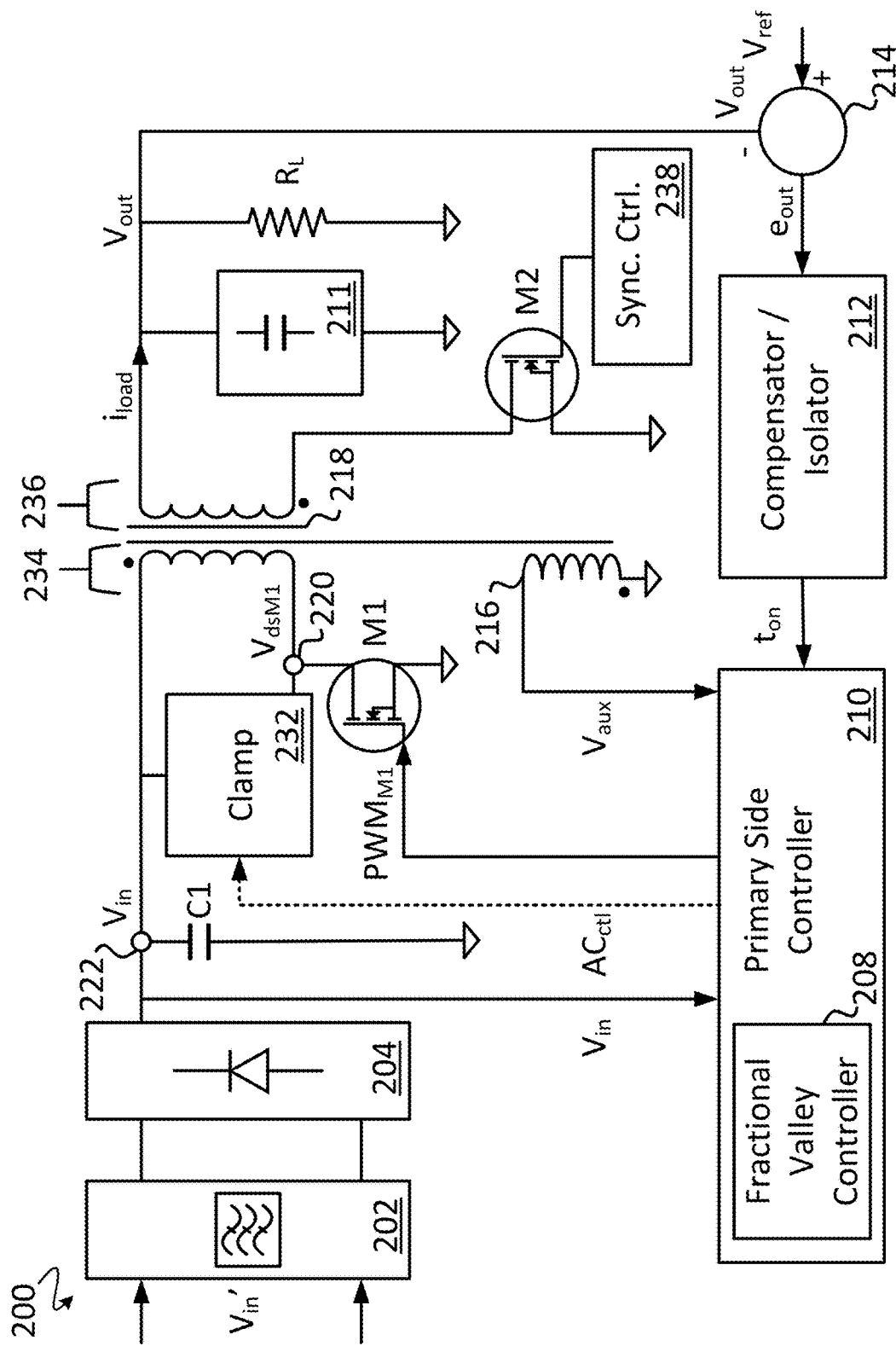
FIG. 2 is a simplified schematic of the power converter of FIG. 1 configured as a fly-back converter, in accordance with some embodiments.

FIG. 2 is a simplified circuit schematic of a power converter 200, in accordance with some embodiments. The power converter 200 is an example embodiment of the power converter 100 when the quasi-resonant converter circuit 106 is implemented as a fly-back converter. Some elements of the power converter 200 have been omitted from FIG. 2 to simplify the description of the power converter 200 but are understood to be present. In general, the power converter 200 includes an input voltage filter block 202, a rectifier block 204 (in the case of AC input), a fractional valley controller 208 of a primary side controller 210 ("a power converter controller"), an output buffer circuit 211, a compensator/isolator ("feedback network") 212, a signal difference block 214, an auxiliary winding 216 of a transformer 218, a clamp circuit 232, a primary winding 234 of the transformer 218 on an input side of the power converter 200, a secondary winding 236 of the transformer 218 on an output side of the power converter 200, a synchronous switch controller 238, an input voltage buffer capacitor C1, a primary-side switch ("main switch") M1, and a synchronous switch M2, coupled as shown. Also shown is a drain-source voltage $V_{dsM1}$ of the main switch M1 at a signal node 220, an input voltage $V_{in}$', a conditioned input voltage $V_{in}$ at a signal node 222, an optional active clamp control signal $AC_{ctl}$, an auxiliary voltage $V_{aux}$, an output voltage $V_{out}$, an output current $i_{load}$, a feedback signal (e.g., a magnetizing inductance charging time $t_{on}$, or other feedback signal), an error signal $e_{out}$, and a reference voltage $V_{ref}$.

The power converter 200 is configured to receive the input voltage $V_{in}$' and to provide the output voltage $V_{out}$ and the output current $i_{load}$ to a load $R_L$ based on an on-time and an off-time of the main switch M1. The on-time and the off-time of the main switch M1 are controlled by the primary side controller 210. The primary side controller 210 is configured to receive the input voltage $V_{in}$, an auxiliary voltage $V_{aux}$, and a magnetizing inductance charging time $t_{on}$ (or other feedback signal) and to generate a main switch control signal $PWM_{M1}$ to control the on-time and off-time of the main switch M1.

The main switch M1 is coupled to the primary winding 234 and is configured to control a current through the primary winding 234 to charge a magnetizing inductance of the transformer 218 using the input voltage $V_{in}$ during a first portion of a switching cycle of the power converter 200 (i.e., when the main switch M1 is turned on). The synchronous rectifier switch M2 controls a current through the secondary winding 236 to discharge the transformer 218 into the output buffer circuit 211 and the load $R_L$ during a subsequent portion of the switching cycle (i.e., when the main switch M1 is turned off). The clamp circuit 232 limits the drain-source voltage $V_{dsM1}$ developed at the drain node of the main switch M1 to a voltage that is less than a maximum safe operating voltage of the main switch M1. In some embodiments, the clamp circuit 232 is an active clamp circuit that is self-driven (e.g., the clamp circuit 232 does not require a control signal provided by the primary side controller 210). In other embodiments, the clamp circuit 232 is an active clamp circuit that is controlled by the primary side controller 210 using the optional active clamp control signal $AC_{ctl}$. In still other embodiments, the clamp circuit 232 is a resistor-capacitor-diode (RCD) snubber circuit.

The feedback network 212 generates an internal error signal that is representative of a difference between the output voltage $V_{out}$ at the output of the power converter 200 and the reference voltage $V_{ref}$. In some embodiments, the feedback network 212 processes the difference through an internal proportional-integral (PI) or proportional-integral-differential (PID) compensator. In some embodiments, the output from the feedback network 212 is mirrored from the output side of the power converter 200 to the input side of the power converter 200 using an isolator. The feedback network 212 provides a feedback signal to the primary side controller 210, which adjusts the main switch control signal $PWM_{M1}$ based on the feedback signal. For example, in some embodiments, the feedback signal corresponds to a desired on-time $t_{on}$ for the main switch M1 to charge the magnetizing inductance of the transformer 218.

The primary side controller 210 is configured to receive the feedback signal from the feedback network 212, the input voltage $V_{in}$, and the auxiliary voltage $V_{aux}$, and to generate the main switch control signal $PWM_{M1}$ based on these received signals. The main switch control signal $PWM_{M1}$ causes the main switch M1 to turn on and off in accordance with the on-time and an off-time $t_{off}$ of the main switch M1. During quasi-resonant operation of the power converter 200, when the main switch M1 is off, a resonant waveform develops at a drain node of the main switch M1. The resonant waveform includes a series of voltage peaks (local maxima) and valleys (local minima). The primary side controller 210 advantageously controls the main switch M1 using the main switch control signal $PWM_{M1}$ such that the main switch M1 is turned on when the voltage $V_{dsM1}$ is at a local minimum, i.e., at a valley of the resonant waveform. During a series of switching cycles of the main switch M1, the fractional valley controller 208 modulates the valley at which the main switch M1 is turned on such that an average of the sequence of modulated valleys converges on a non-integer valley number. For example, an integer valley sequence of integer valley numbers: {2,2,2,1} has a non-integer (i.e., fractional) average value of 1.75.

Figure 3:
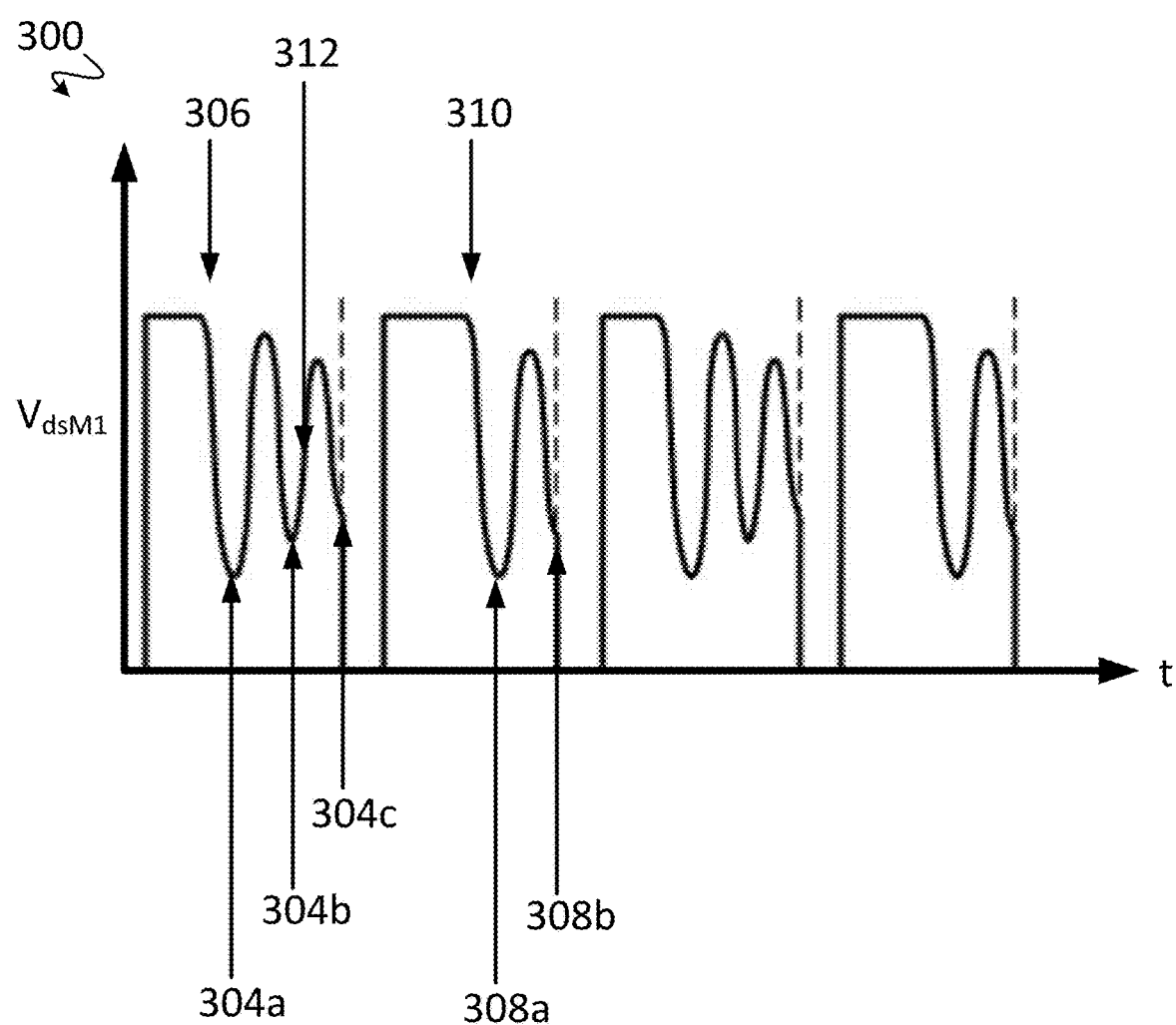
FIG. 3 is a simplified plot of signals related to the power converter shown in FIG. 2, in accordance with some embodiments.

A simplified plot 300 of the drain-source voltage $V_{dsM1}$ (i.e., a resonant waveform), at the drain node of the main switch M1, having integer valleys 304a-c during a first switching cycle 306, and integer valleys 308a-b during a second switching cycle 310 is shown in FIG. 3. By controlling the off-time of the main switch M1, the primary side controller 210 adjusts a total power ($i_{load}$, $V_{out}$) delivered to the load $R_L$. For example, by controlling the off-time of the main switch M1 to switch on the third valley 304c of the first switching cycle 306, the primary side controller 210 will cause less power to be delivered to the load $R_L$ than during the second switching cycle 310 during which the main switch M1 is switched on the second valley 308b.

Unfortunately, in some instances, the total power to be delivered to the load $R_L$ will correspond to a non-integer number of valleys (e.g., the point 312). As discussed previously, switching the main switch M1 when the drain-source voltage $V_{dsM1}$ of the main switch M1 is not at a minimum results in switching losses that are greater than if the main switch M1 is switched only when the drain-source voltage $V_{dsM1}$ is at a minimum (i.e., corresponding to an integer number of valleys). Thus, if the main switch M1 is frequently switched at a non-integer number of valleys (e.g., the point 312), switching losses of the power converter 200 will be greater than if the main switch M1 is switched at any of the integer number of valleys (e.g., 304a-c).

The fractional valley controller 208 as disclosed herein advantageously controls, by fractional valley switching, the off-time of the main switch M1 such that the main switch M1 is only switched at an integer number of valleys (i.e., in the middle of one of the valleys) but enables the power converter 200 to still deliver a total power to the load $R_L$ that corresponds to a non-integer number of valleys. As described below, fractional valley switching as disclosed herein is used, in some embodiments, for frequency dithering of the power converter 200 to spread an average conducted EMI of the power converter 200 across a wide frequency band (e.g., across multiple 9 kHz bands), thereby reducing a peak conducted EMI at any given frequency. Additionally, fractional valley switching, as disclosed herein, enables such non-integer numbers of valleys to have a greater than typical fractional range. For example, a typical valley dithering approach that dithers or "hops" between two adjacent valleys may deliver a total power that corresponds to an average between the two adjacent valleys. That is, hopping or dithering between valley 1 (304a) and valley 2 (304b) will converge on an average that corresponds to valley 1.5. However, such typical valley dithering approaches cannot deliver a total power that corresponds to a greater resolution of decimal values between integer valleys (e.g., corresponding to valley 1.25, valley 1.3, valley 1.4, valley 1.45, valley 1.55, and so on).

Figure 4:
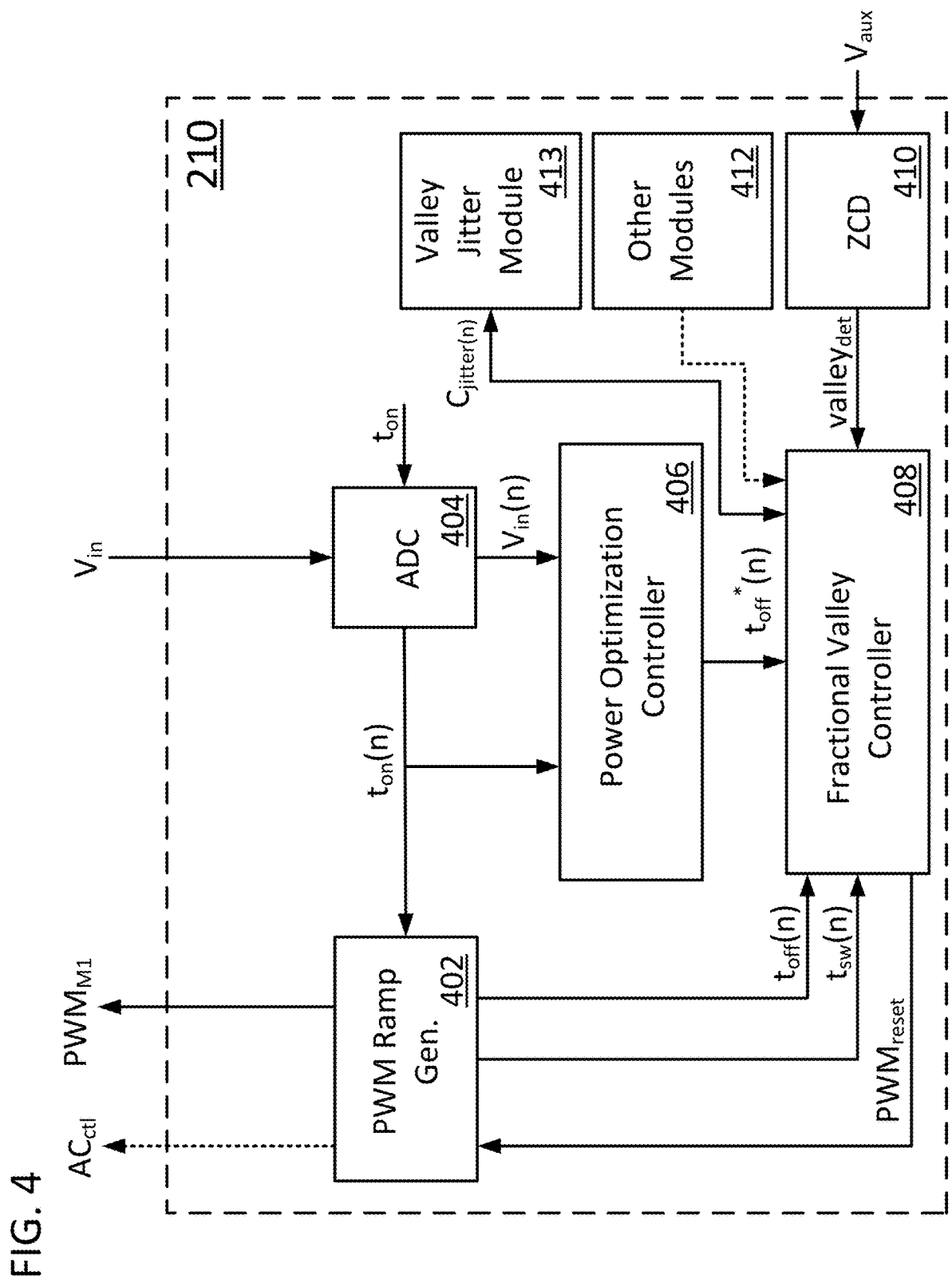
FIG. 4 is a simplified schematic of a primary side controller of the power converter shown in FIG. 2, in accordance with some embodiments.

Details of the primary side controller 210, in accordance with some embodiments, are shown in FIG. 4. Some elements and signals of the primary side controller 210 have been omitted from FIG. 4 to simplify the description of the primary side controller 210 but are understood to be present. In general, the primary side controller 210 includes a PWM ramp generator ("PWM Ramp Gen.") 402, an analog to digital converter (ADC) module 404, a power optimization controller 406, a fractional valley controller 408, a zero-crossing detector (ZCD) 410, other modules 412, and a valley jitter module 413, coupled as shown.

In some embodiments, the valley jitter module 413 may include one or more of a look-up-table, a memory circuit, a counter circuit, a combinational circuit, a finite-state-machine, or other digital and/or analog circuits. In some embodiments, the other modules 412 include other digital and/or analog modules of the primary side controller 210, such as additional control circuitry, one or more processors (e.g., microcontrollers, microprocessors, DSPs, ASICs, FPGAs), volatile data storage, non-volatile data storage, communication modules, or still other components. In some embodiments, one or more components of the other modules 412 may be in signal communication with one or more of the described components of the primary side controller 210 and/or with other components of the power converter 200.

The ADC module 404 is configured to generate a digitized feedback signal $t_{on}(n)$ based on the feedback signal $t_{on}$ (the desired on-time of the main switch M1). The ADC module 404 is further configured to generate a digitized input voltage $V_{in}(n)$ based on the conditioned input voltage $V_{in}$. In some embodiments, the power optimization controller 406 generates a desired off time $t_{off}*(n)$ of the main switch M1 as described in related application, U.S. patent application Ser. No. 16/020,496. The ZCD 410 generates a valley detection signal valley$_{det}$ for each detected valley (e.g., the integer valleys 304a-c). In some embodiments, the ZCD 410 detects each of the valleys of the resonant waveform at the drain node of the main switch M1 using the auxiliary voltage $V_{aux}$ generated using the auxiliary winding 216. In other embodiments, the ZCD 410 detects each of the valleys of the resonant waveform at the drain node of the main switch M1 using a voltage received from, or based on the voltage at, the drain node of the main switch M1. The fractional valley controller 408 is configured to receive the valley detection signal valley$_{det}$, a measured off-time $t_{off}(n)$ of the main switch M1, a switching cycle frequency signal $t_{sw}(n)$ (a value representative of the switching period or switching frequency of the main switch M1), and a desired off-time $t_{off}*(n)$ for the main switch M1 from the power optimization controller 406.

The desired off-time $t_{off}*(n)$ is a calculated off-time of the main switch M1 which corresponds to a total power to be delivered to the load $R_L$. As described earlier, in some instances, the desired off-time $t_{off}*(n)$ of the main switch M1 corresponds to a non-integer number of valleys. The fractional valley controller 408 is configured to modulate the off-time $t_{off}(n)$ of the main switch M1 between a series of modulated off-times. A modulated off-time is an off-time of the main switch M1 that differs in time as compared to one or more other off-times in the series of modulated off-times. That is, in the series of modulated off-times, a first modulated off-time may have a duration of t, a second modulated off-time may have a duration of t+τ, a third modulated off-time may also have a duration of t+τ, a fourth modulated off-time may have a duration of t . . . , and so on, where τ is a delay.

Each of the modulated off-times corresponds to an integer number of valleys of the resonant waveform at the drain node of the main switch M1. However, an average value of the modulated off-times of the main switch M1 converges to an average off-time of the main switch M1 that corresponds to a non-integer number of valleys. Thus, the fractional valley controller 408 advantageously switches the main switch M1 at points where the drain-source voltage $V_{dsM1}$ of the main switch M1 is minimized, but the total power delivered to the load $R_L$ is equal to a total power that corresponds to a non-integer number of valleys. The fractional valley controller 408 causes the main switch M1 to switch in accordance with the modulated off-times of the main switch M1 by transmitting a reset signal, PWM$_{reset}$, to the PWM ramp generator 402 when a number of valleys detected using the ZCD 410 exceeds a target number of valleys determined by the fractional valley controller 408.

In some embodiments, the valley jitter module 413 is configured to provide a valley jitter control signal $C_{jitter}(n)$ to the fractional valley controller 408 to control a modulation of a series of average off-times of the main switch M1 to spread an average conducted EMI of the power converter 200 across a wide frequency range (e.g., across multiple 9 kHz frequency bands) to reduce a peak EMI level at any given frequency. In some embodiments, the valley jitter control signal $C_{jitter}(n)$ is a bi-directional signal.

Figure 5:
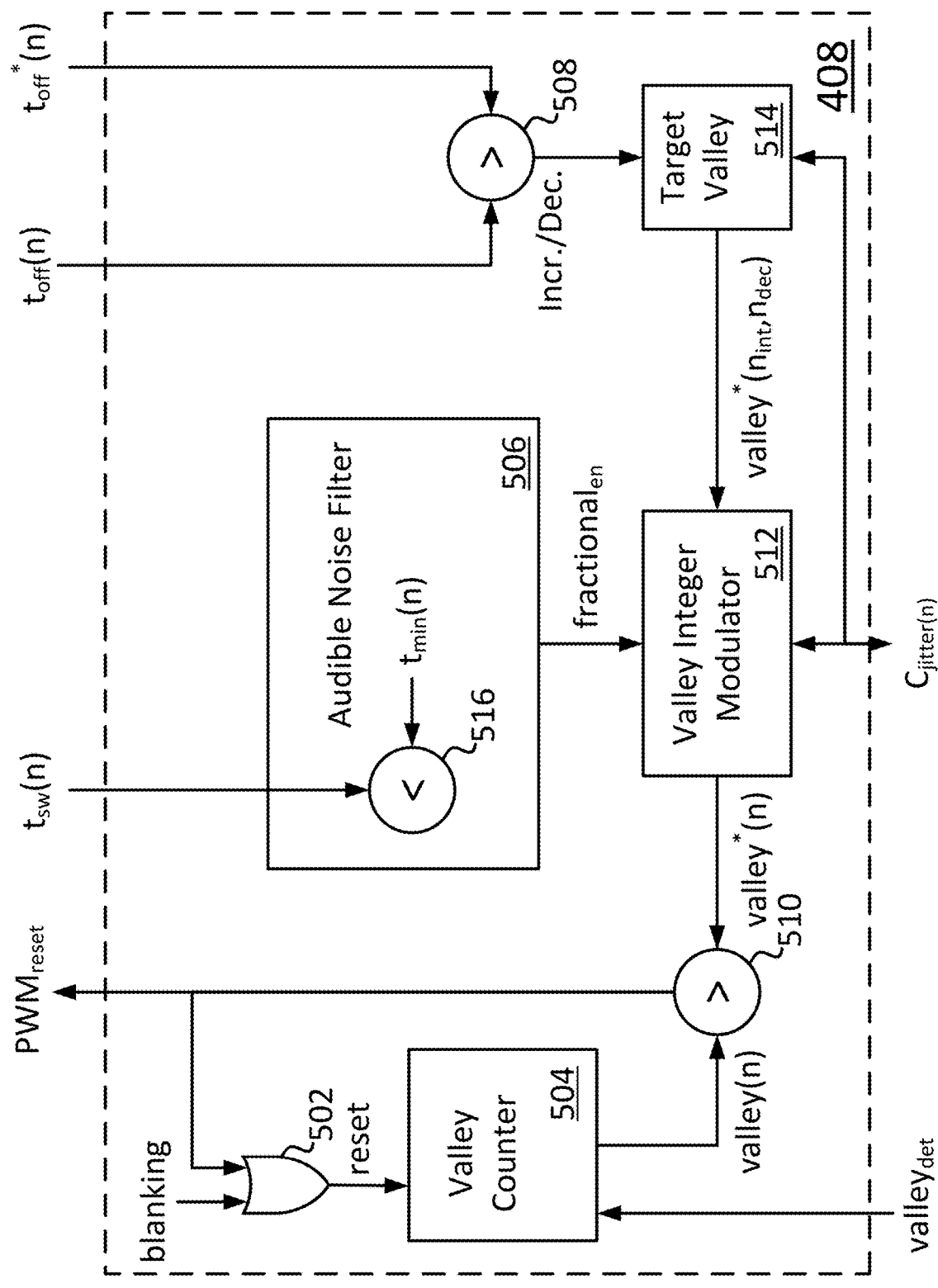
FIG. 5 is a simplified schematic of a fractional valley controller of the primary side controller shown in FIG. 4, in accordance with some embodiments.

A simplified schematic of the fractional valley controller 408, in accordance with some embodiments, is shown in FIG. 5. Some elements of the fractional valley controller 408 have been omitted from FIG. 5 to simplify the description of the fractional valley controller 408 but are understood to be present. In general, the fractional valley controller 408 includes an OR gate 502, a valley counter 504, an audible noise filter 506, a first signal comparison block 508, a second signal comparison block 510, a valley integer modulator 512, and a target valley generator 514. The audible noise filter 506 generally includes a third signal comparison block 516.

The first signal comparison block 508 is configured to receive the measured off-time $t_{off}(n)$ of the main switch M1 and the desired off-time $t_{off}*(n)$ of the main switch M1 and to generate an off-time adjustment signal ("Incr./Dec."). The first signal comparison block 508 compares the measured off-time $t_{off}(n)$ to the desired off-time $t_{off}*(n)$. If the measured off-time $t_{off}(n)$ is greater than the desired off-time $t_{off}*(n)$, the first signal comparison block 508 generates a decrement off-time adjustment signal which indicates that the main switch M1 should be switched at a point in time that corresponds to an earlier valley than that at which the main switch M1 is currently being switched. If the measured off-time $t_{off}(n)$ is not greater than the desired off-time $t_{off}*(n)$, the first signal comparison block 508 generates an increment off-time adjustment signal which indicates that the main switch M1 should be switched at a point in time that corresponds to a later valley than that at which the main switch M1 is currently being switched.

The target valley generator 514 receives the off-time adjustment signals ("Incr./Dec.") from the first signal comparison block 508 and generates a target valley number, valley*($n_{int}$, $n_{dec}$), having an integer portion (i.e., $n_{int}$) and a decimal portion (i.e., $n_{dec}$). For instance, if the target valley number is 2.65, the integer portion corresponds to the integer value 2, and the decimal portion corresponds to the decimal value 0.65. However, the target valley number is not limited to only corresponding to non-integer numbers of valleys. For example, for some desired off-times $t_{off}*(n)$ of the main switch M1, the target valley number may have a decimal portion that is equal to zero.

The valley integer modulator 512 is configured to receive the target valley number, valley*($n_{int}$, $n_{dec}$), and to generate a series of modulated integer valley numbers valley*(n). A modulated integer valley number is a valley number that differs in number as compared to one or more other valley numbers in the series of modulated integer valley numbers. That is, in the series of modulated integer valley numbers, a first modulated integer valley number may be 1, a second modulated integer valley number may be 2, a third modulated integer valley number may also be 2, a fourth modulated valley integer number may be 1 . . . , and so on. Advantageously, in some embodiments, the valley integer modulator 512 is configured to generate non-alternating sequences of modulated integer valley numbers. An example of an alternating sequence of integer valley numbers is {1, 2, 1, 2, 1, 2, . . . }. An example of a non-alternating sequence of integer valley numbers is {1, 2, 2, 2, 1, 2, 2, 2, . . . }. That is, the fractional valley controller 208 is configured to generate a first sequence of one or more first integer valley numbers in series immediately followed by a second sequence of one or more second integer valley numbers in series, where a length of the first sequence is different than a length of the second sequence, and the one or more first integer valley numbers are not equal to the one or more second integer valley numbers.

Each of the modulated integer valley numbers valley*(n) corresponds to a modulated off-time of the main switch M1. Thus, the series of modulated integer valley numbers, valley*(n), converge on an average valley number that is equal to, or close to equal to (i.e., "about"), the target valley number which is a non-integer valley number.

The valley counter 504 receives the valley$_{det}$ signal from the ZCD 410 and increments an internal counter to generate a detected valley count, valley(n). The second signal comparison block 510 compares a most recent detected valley count, valley(n), to a most recent modulated integer valley number, valley*(n). Upon determining that the most recent detected valley count, valley(n), is greater than the most recent modulated integer valley number, valley*(n), the second signal comparison block 510 transmits a PWM$_{reset}$ signal to the OR gate 502 and to the PWM ramp generator 402. Upon receiving the PWM$_{reset}$ signal, the PWM ramp generator 402 transmits a main switch control signal PWM$_{M1}$ at a level that enables the main switch M1. Thus, the main switch M1 is advantageously switched at a point in time that corresponds to an integer valley number even though the output power of the power converter 200 converges to a power corresponding to a non-integer valley number.

The OR gate 502 transmits a reset signal to the valley counter 504 upon receiving the PWM$_{reset}$ signal. Upon receiving the reset signal, the valley counter 504 resets the internal valley count value to an initial value (e.g., 0). Additionally, the OR gate 502 transmits the reset signal to the valley counter 504 upon receiving a blanking signal (e.g., during a time when the main switch M1 is not disabled).

In some embodiments, the valley integer modulator 512 is advantageously configured to only perform fractional valley switching when a switching frequency of the main switch M1 is higher than a minimum frequency threshold such that the modulated off-times of the main switch M1 will not generate frequencies that are in the range of audible noise (e.g., equal to or less than 30 kHz). The audible noise filter 506 receives the measured switching cycle frequency signal $t_{sw}(n)$ from the PWM ramp generator 402 and receives a minimum switching cycle frequency threshold $t_{min}(n)$ (e.g., from a processor or other component of the other modules 412, or from another source such as a configuration component of the power converter 200). Upon determining that the measured switching cycle frequency signal $t_{sw}(n)$ is less than the minimum switching cycle frequency threshold $t_{min}(n)$, the third signal comparison block 516 sends a de-asserted fractional$_{en}$ signal to the valley integer modulator 512 to disable fractional valley switching. Upon determining that the measured switching cycle frequency signal $t_{sw}(n)$ is not less than the minimum switching cycle frequency threshold $t_{min}(n)$, the third signal comparison block 516 sends an asserted fractional$_{en}$ signal to the valley integer modulator 512 to enable fractional valley switching. Thus, in such embodiments, fractional valley switching is advantageously disabled if fractional valley switching would result in undesirable audible tones.

In some embodiments, the valley integer modulator 512 is configured to receive the valley jitter control signal $C_{jitter}(n)$ from the valley jitter module 413, and modulation between a series of intermediate valley numbers is controlled by the valley integer modulator 512. In other embodiments, the valley jitter control signal $C_{jitter}(n)$ controls modulation, by the valley integer modulator 512, between the series of intermediate valley numbers. In some embodiments, the valley jitter control signal $C_{jitter}(n)$ enables and disables fractional valley switching.

Each of the intermediate valley numbers may be a fractional valley number or an integer valley number. An average of the series of intermediate valley numbers may correspond to (i.e., be equal to, or be about (i.e., closely) equal to), the target valley number valley*($n_{int}$, $n_{dec}$). In some embodiments, the series of intermediate valley numbers may be generated by the valley integer modulator 512 based on the target valley number valley*($n_{int}$, $n_{dec}$). In other embodiments, the valley jitter control signal $C_{jitter}(n)$ is received by the target valley generator 514 and is used to control generation of the series of intermediate valley numbers, which are then subsequently received by the valley integer modulator 512. In other embodiments, the valley jitter module 413 receives the original target valley number valley*($n_{int}$, $n_{dec}$) and uses the target valley number valley*($n_{int}$, $n_{dec}$) to select the series of intermediate valley numbers which are then communicated to the valley integer modulator 512. In some embodiments, the valley jitter control signal $C_{jitter}(n)$ includes a fractional mode signal that is similar to or the same as the fractional$_{en}$ signal. In such embodiments, the fractional mode signal may be used to modulate between an integer valley switching mode using a first modulator of the valley integer modulator 512, and a fractional valley switching mode using a second modulator of the valley integer modulator 512. In some embodiments, the valley jitter control signal $C_{jitter}(n)$ overrides or works in conjunction with the fractional$_{en}$ signal generated by the audible noise filter 506.

Figure 6:
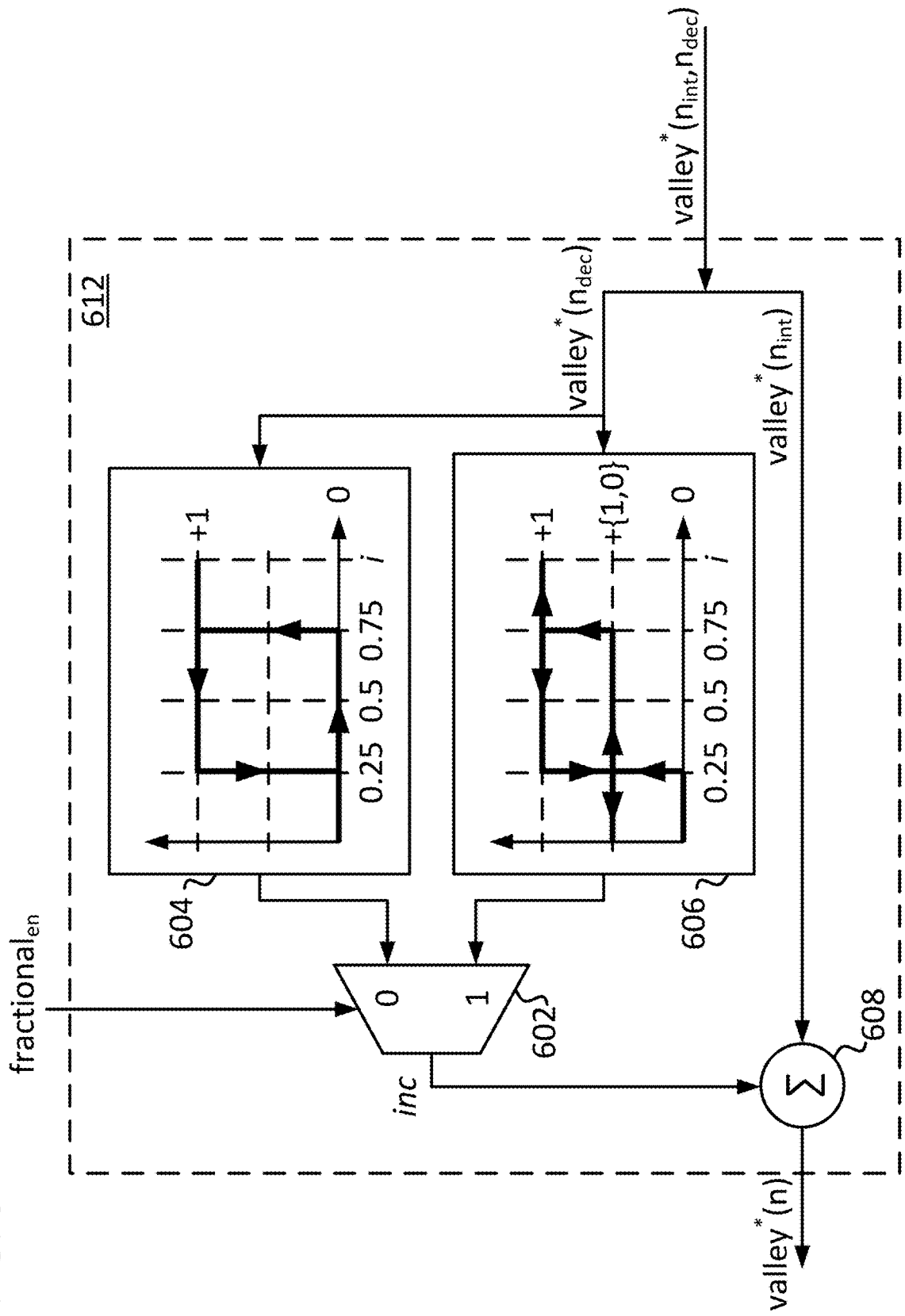
FIGS. 6-7 are simplified schematics of valley integer modulators of the fractional valley controller shown in FIG. 5, in accordance with some embodiments.

FIG. 6 is a simplified schematic of an example valley integer modulator 612 that implements the valley integer modulator 512, in accordance with some embodiments. The valley integer modulator 612 is suitable for switching cycle frequencies $t_{sw}(n)$ that are greater than 60 kHz due to generated tones which are in some instances one-half of the switching cycle frequency $t_{sw}(n)$. Some elements of the valley integer modulator 612 have been omitted from FIG. 6 to simplify the description of the valley integer modulator 612 but are understood to be present. The valley integer modulator 612 generally includes a mux 602 (i.e., a component that receives two or more input signals and selectively passes one of the two or more input signals to an output of the mux), a first modulator 604, a second modulator 606, and a signal adder block 608. The mux 602 receives the fractional$_{en}$ signal from the audible noise filter 506. If the fractional$_{en}$ signal is de-asserted, the mux 602 passes an output from the first modulator 604 to the signal adder block 608. If the fractional$_{en}$ signal is asserted, the mux 602 passes an output from the second modulator 606 to the signal adder block 608. In some embodiments, the first modulator 604 generates an output with hysteresis such that the output, inc, of the mux 602 transitions to 1 if the decimal portion, valley*($n_{dec}$), is greater than or equal to 0.75 for a given initial output of 0. In such embodiments, the first modulator 604 generates an output with hysteresis generally such that the output, inc, of the mux 602 transitions to 0 if the decimal portion, valley*($n_{dec}$), is less than or equal to 0.25 for a given initial output of 1. When fractional valley switching is disabled, output ripple of the power converter 200 may increase as compared to output ripple when fractional valley switching is enabled.

In some embodiments, the second modulator 606 generates an output using a different hysteresis than that of the first modulator 604. In such embodiments, the second modulator 606 generates an output that modulates between 1 and 0 based the decimal portion, valley*($n_{dec}$) of the target valley number, valley*($n_{int}$, $n_{dec}$). That is, for a range of decimal values that, in contrast, corresponds to a dead-band of the first modulator 604, the second modulator 606 generates a stream of values that modulate between 0 and 1.

The output, inc, of the mux 602 is summed with the integer portion valley*($n_{int}$) of the target valley number valley*($n_{int}$, $n_{dec}$) by the signal adder block 608, thereby generating the stream of modulated output valley numbers, valley*(n).

Figure 7:
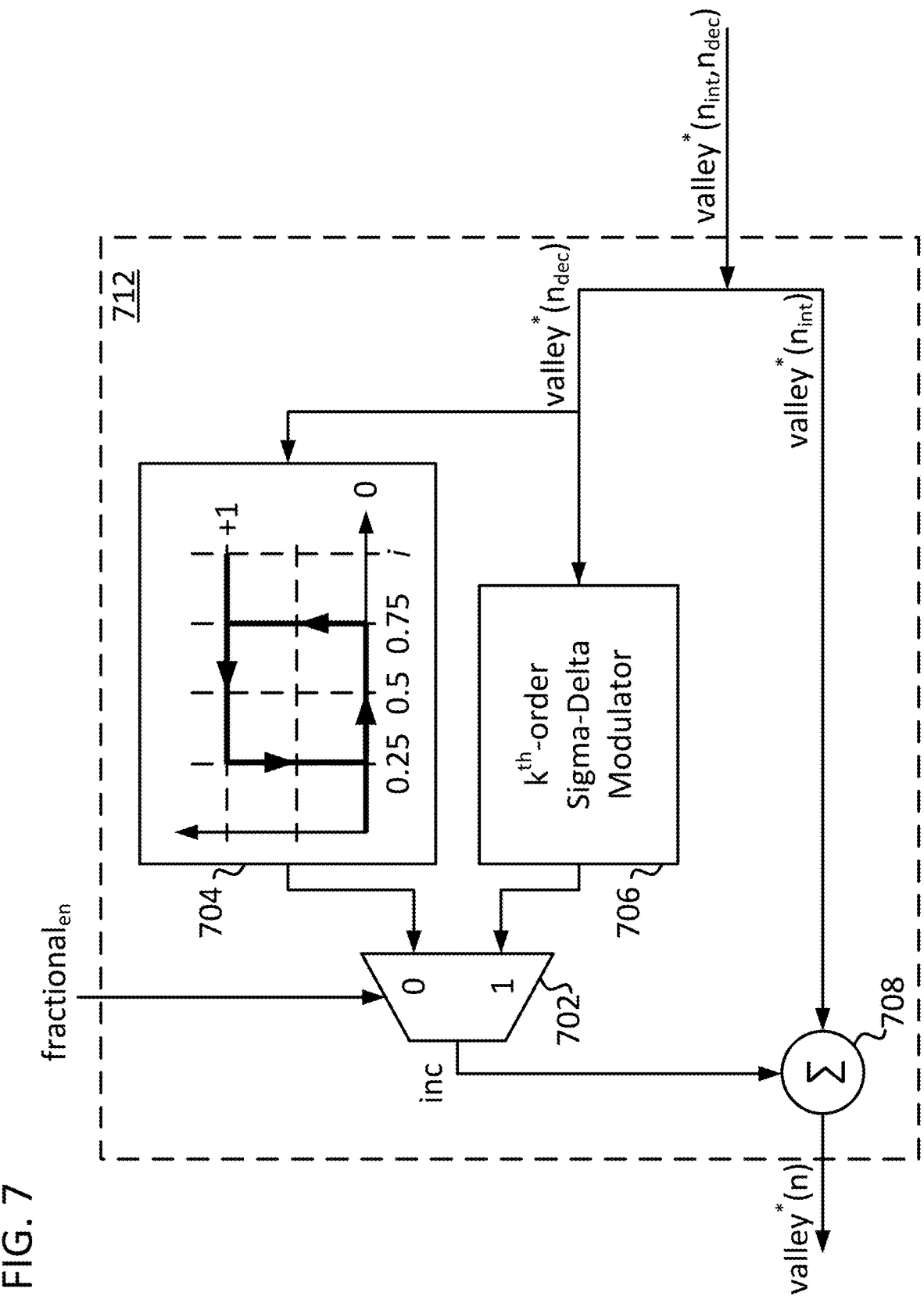

FIG. 7 is a simplified schematic of another example valley integer modulator 712 that implements the valley integer modulator 512, in accordance with some embodiments. The valley integer modulator 712 is suitable for switching cycle frequencies $t_{sw}(n)$ that are greater than 250 kHz due to low-frequency tones that are generated in some instances by a $k^{th}$-order sigma-delta modulator implemented by a second modulator 706. Some elements of the valley integer modulator 712 have been omitted from FIG. 7 to simplify the description of the valley integer modulator 712 but are understood to be present. The valley integer modulator 712 generally includes a mux 702, a first modulator 704, the second modulator 706, and a signal adder block 708. The mux 702 receives the fractional$_{en}$ signal from the audible noise filter 506. If the fractional$_{en}$ signal is de-asserted, the mux 702 generates an output, inc, using an output from the first modulator 704. The output, inc, for the mux 702 is received by the signal adder block 708. If the fractional$_{en}$ signal is asserted, the mux 702 generates the output, inc, using an output from the second modulator 706. In some embodiments, the first modulator 704 generates an output as described with reference to the first modulator 604 of FIG. 6.

The $k^{th}$-order sigma-delta modulator implemented by the second modulator 706 is configured to receive the decimal portion, valley*($n_{dec}$) of the target valley number valley*($n_{int}$, $n_{dec}$) and to generate an output stream of "highs" and "lows" (i.e., 1's and 0's) based on the decimal portion, valley*($n_{dec}$). The sigma-delta modulator of the second modulator 706 generates an output stream of values such that a number of 1's in the output stream of values increases as a value of the decimal portion, valley*($n_{dec}$) increases. Similarly, the sigma-delta modulator of the second modulator 706 generates an output stream of values such that a number of 0's in the output stream of values increases as a value of the decimal portion, valley*($n_{dec}$) decreases. The order of the sigma-delta modulator of the second modulator 706 dictates the number of integrators, i.e., the number of feedback loops, utilized. The higher the order, the higher the achievable fractional valley resolution. The sigma-delta modulator of the second modulator 706 advantageously generates the output stream as a noise-shaped signal to achieve a higher resolution of fractional valley switching with a predictive frequency content as compared to hysteresis-based approaches. For example, an example sequence of modulated integer valley numbers, valley*(n), generated by the valley integer modulator 712 could include a sequence such as {4, 2, 1, 2 . . . }, which converges on a non-integer valley number of 2.25.

Figure 8:
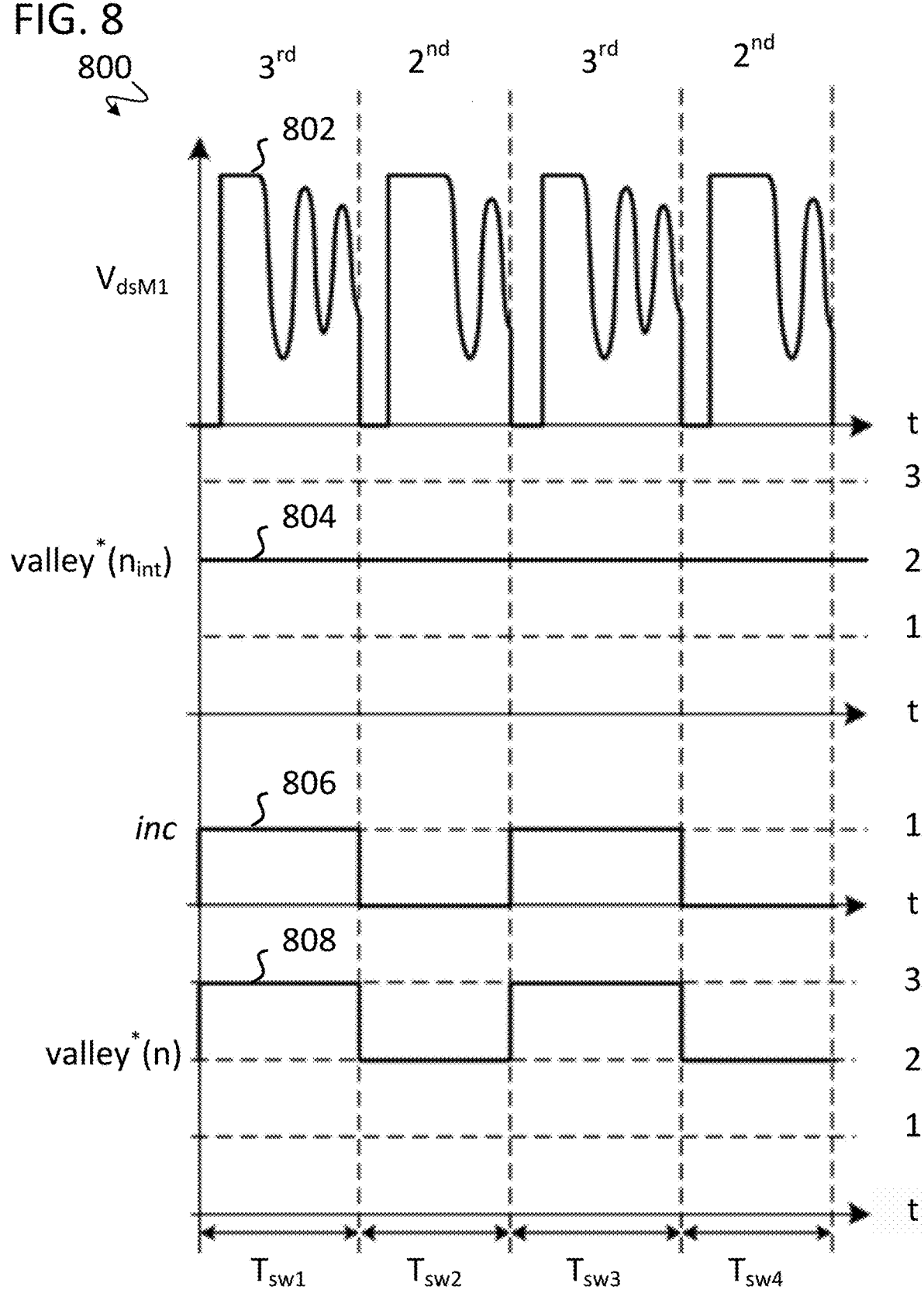
FIG. 8 is a simplified plot of signals related to the power converter shown in FIG. 2, in accordance with some embodiments.

FIG. 8 shows a simplified plot 800 of signals related to the power converter 200 indicating operation thereof, in accordance with some embodiments. The simplified plot 800 includes a plot 802 of the drain-source voltage $V_{dsM1}$ of the main switch M1 (i.e., a resonant waveform), a plot 804 of the integer portion valley*($n_{ist}$) of the target valley number, valley*($n_{ist}$, $n_{dec}$), a plot 806 of the output, inc, of the mux 602 or 702, and a plot 808 of a resultant modulated integer valley number, valley*(n). In the example shown in the simplified plot 800, an average valley number of the resonant waveform at the drain node of the main switch M1 converges on a non-integer valley number of 2.5.

Figure 9:
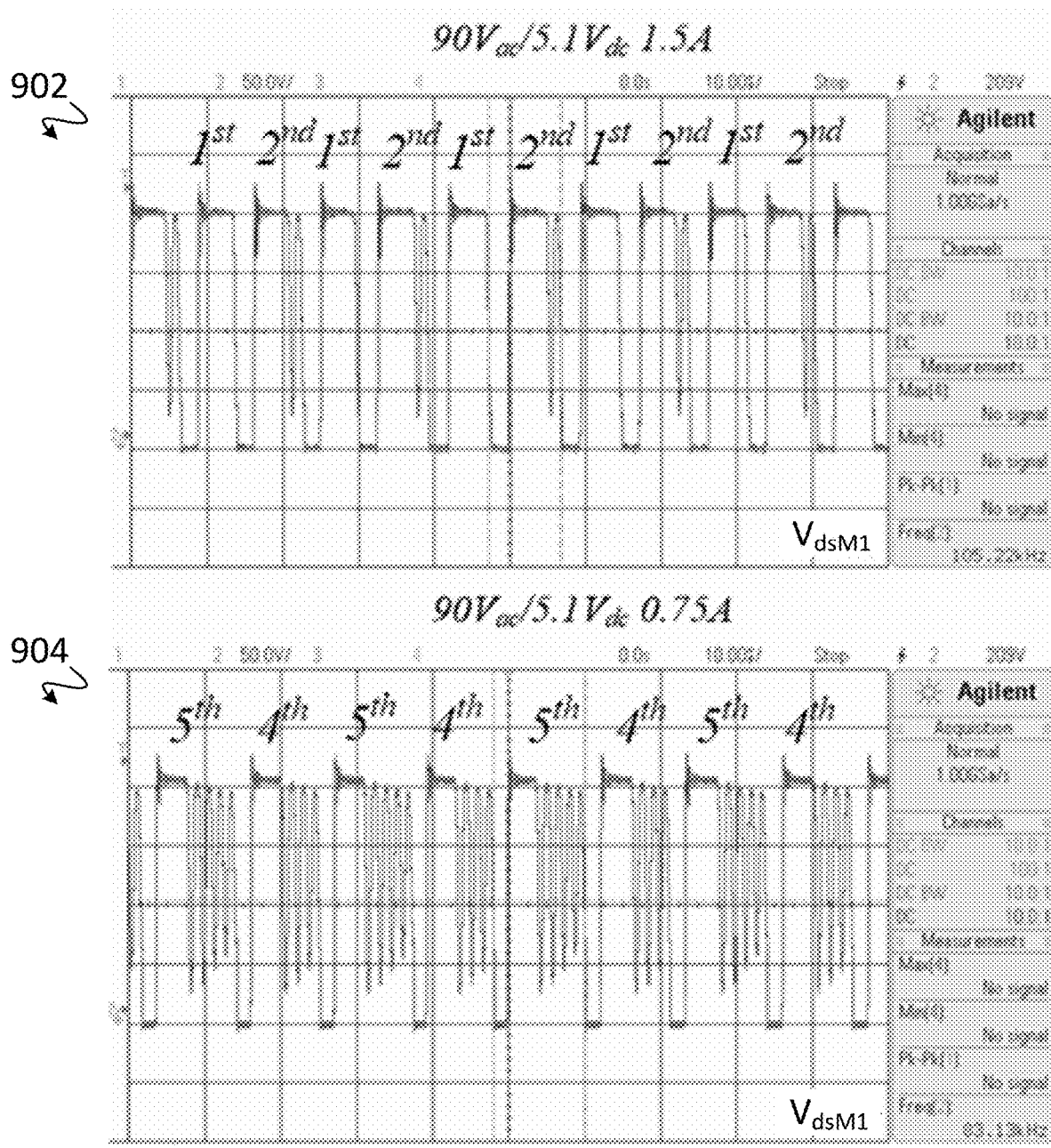
FIGS. 9-10 are screenshots of experimental results for a test power converter that is similar to the power converter shown in FIG. 2, in accordance with some embodiments.

FIG. 9 shows screenshots 902, 904 of experimental results for a test power converter that is similar to the power converter 200, in accordance with some embodiments. Each of the screenshots 902, 904 shows a drain-source voltage $V_{dsM1}$ measurement of a main switch of the test power converter over time. The screenshot 902 illustrates fractional valley switching between a $1^{st}$ valley and $2^{nd}$ valley to achieve a 1.5A output to a load of the test power converter. The screenshot 904 illustrates fractional valley switching between a $4^{th}$ valley and a $5^{th}$ valley to achieve a 0.75A output to the load of the test power converter.

Figure 10:
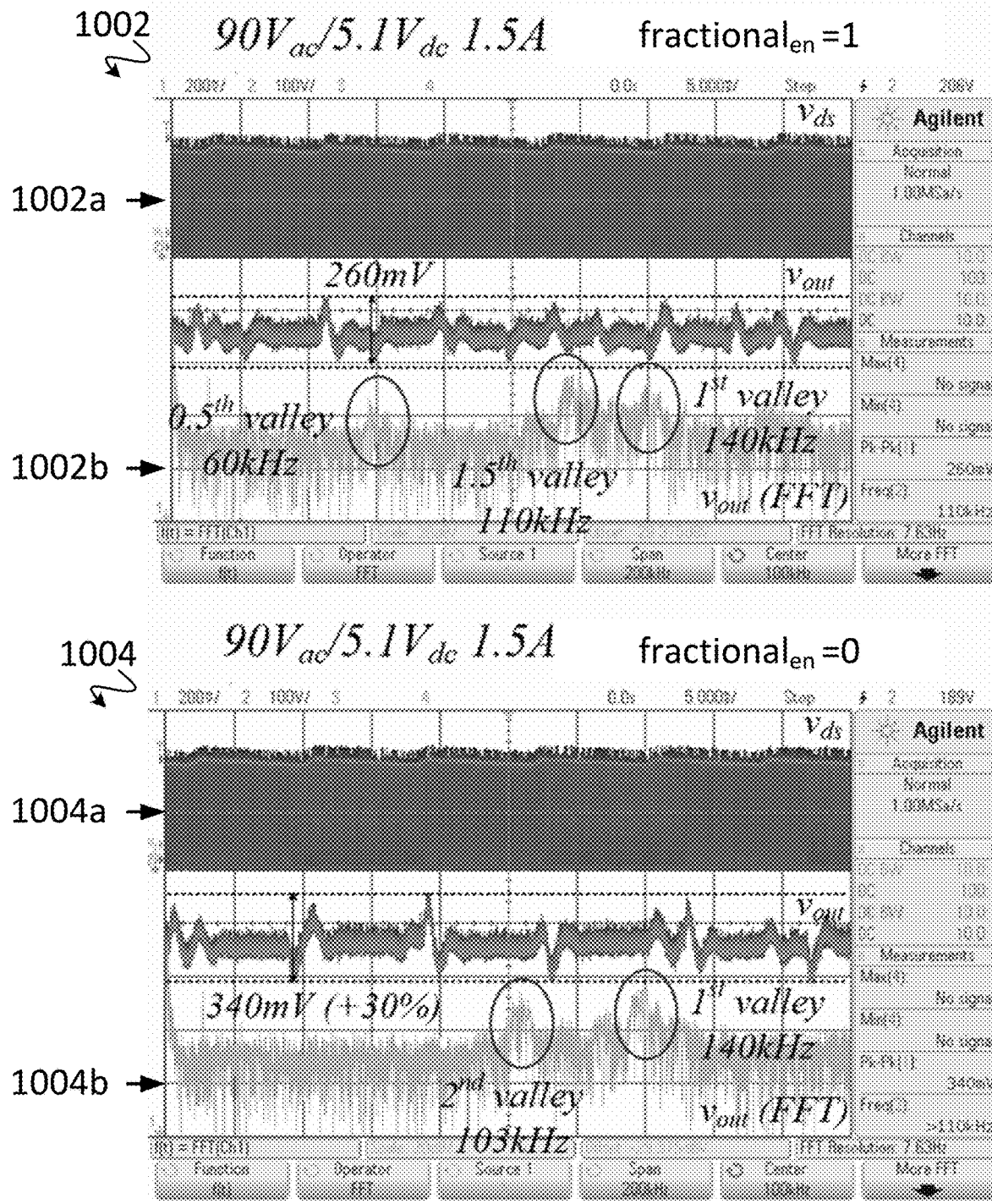

FIG. 10 shows screenshots 1002, 1004 of experimental results for a test power converter that is similar to the power converter 200, in accordance with some embodiments. Each of the screenshots 1002, 1004 show time (1002a/1004a) and frequency domain (1002b/1004b) measurements of a drain-source voltage $V_{dsM1}$ of a main switch of the test power converter. The screenshot 1002 illustrates the time and frequency domain measurements of $V_{dsM1}$ when fractional valley switching is enabled (i.e., fractional$_{en}$=1), and the screenshot 1004 illustrates the time and frequency domain measurements of $V_{dsM1}$ when fractional valley switching is disabled (i.e., fractional$_{en}$=0) for a 90Vac/5.1Vdc 1.5A operating condition of the test power converter. As shown, the output voltage ripple of the test power converter is advantageously reduced from 340 mV to 260 mV when fractional valley switching is enabled. A 60 kHz frequency component is generated by the test power converter when fractional valley switching is enabled; however, the 60 kHz frequency component is outside of an audible noise range.

Frequency Jitter Using Fractional Valley Switching

Peak conducted EMI reduction using fractional valley switching can be implemented by either the fractional valley controller 108 of the power converter 100 or by the fractional valley controller 208 of the power converter 200. However, for simplicity of description, frequency jitter using fractional valley switching is described herein within the context of the power converter 200.

In some embodiments, the fractional valley controller 208 modulates between a series of average off-times of the main switch M1 of the power converter 200. Each average off-time of the series of average off-times corresponds to a respective intermediate valley number of a series of intermediate valley numbers of the resonant waveform developed at the drain node of the main switch M1. An average of the series of intermediate valley numbers corresponds to a desired, optimal, or target valley number (e.g., as generated by the target valley generator 514).

The fractional valley controller 208 advantageously modulates between the average off-times of the main switch M1 with a periodicity such that the modulation generates an audible tone that is within a frequency range (e.g., 100-200 Hz) that the human ear is significantly less sensitive to as compared to audible tones in a higher frequency range. By modulating the average off-time of the main switch M1 rather than varying a switching frequency of the main switch M1, an average conducted EMI of the power converter is advantageously spread across a wide frequency band without causing a significant reduction of a power processing efficiency of the power converter 200. Because the average of the series of modulated off-times of the main switch corresponds to the desired or target off-time of the main switch, the power converter 200 is operable to meet an optimized operating criteria while still minimizing a peak conducted EMI of the power converter 200. Additionally, in some embodiments, one or more average off-times of the modulated average off-times of the main switch M1 advantageously correspond to a non-integer (i.e., fractional) valley number, thereby further enabling the power converter 200 to meet the optimized operating criteria.

Figure 11:
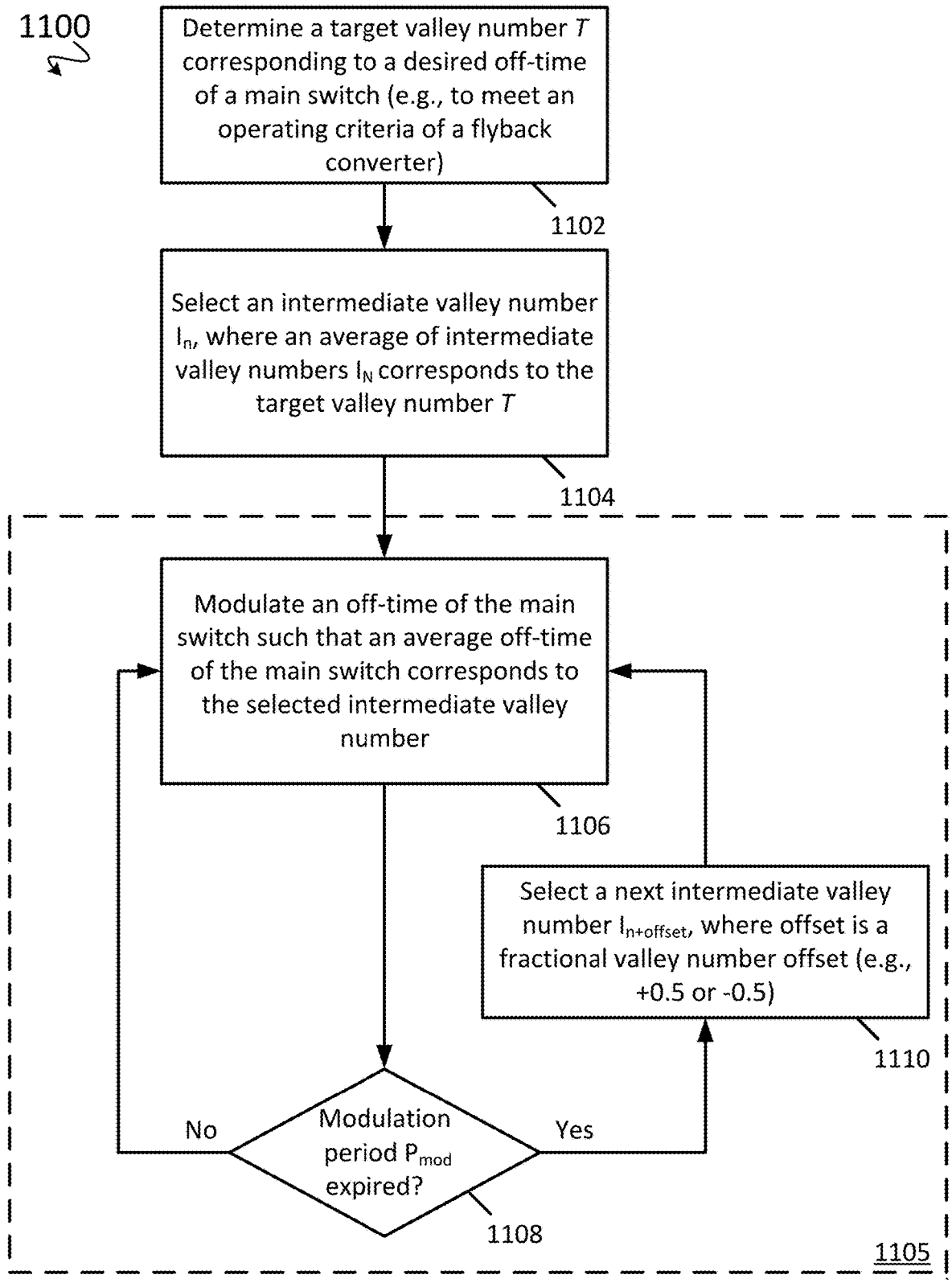
FIG. 11 is a portion of an example process for operation of the power converter shown in FIG. 2, in accordance with some embodiments.

FIG. 11 shows a portion of an example process 1100 for frequency jitter using fractional valley switching, in accordance with some embodiments. All or a portion of the process 1100 is implemented, in some embodiments, by either the fractional valley controller 108 of the power converter 100 or by the fractional valley controller 208 of the power converter 200. The particular steps, order of steps, and combination of steps are shown for illustrative and explanatory purposes only. Other embodiments can implement different particular steps, orders of steps, and combinations of steps to achieve similar functions or results.

At step 1102, a target valley number T (e.g., valley*($n_{ist}$, $n_{dec}$)) corresponding to a desired off-time of the main switch M1 is determined (e.g., by the target valley generator 514), for example, to meet an operating criteria of the power converter 200. At step 1104, an intermediate valley number $I_n$ is selected (e.g., by the valley jitter module 413). The intermediate valley number $I_n$ is one intermediate valley number of a series of intermediate valley numbers $I_N$. An average of the series of intermediate valley numbers $I_N$ corresponds to (i.e., is equal to, or about equal to) the target valley number T Block 1105 illustrates a first example embodiment of modulation between the series of intermediate valley numbers $I_N$ to spread an average conducted EMI of the power converter 200 across a range of frequencies (e.g., across multiple 9 kHz frequency bands).

At step 1106 of block 1105, an off-time of the main switch M1 is modulated by the valley integer modulator 512 such that an average off-time of the main switch corresponds to the selected intermediate valley number (i.e., $I_n$). In some embodiments, the off-time of the main switch M1 is modulated by varying a duration of the off-time of the main switch M1 using either of the embodiments 612/712 of the valley integer modulator 512.

In some embodiments, the valley integer modulator 512 receives the intermediate valley number $I_n$ from the target valley generator 514 in place of the valley*($n_{int}$, $n_{dec}$) signal. In such embodiments, the target valley generator 514 receives the valley jitter control signal $C_{jitter}$(n) and selects each intermediate valley number $I_n$ of the series of intermediate valley numbers $I_N$ such that an average of the series intermediate valley numbers $I_N$ corresponds to (i.e., is equal to, or about equal to) the target valley number T. In some embodiments, selecting each intermediate valley number $I_n$ may involve generating one or more of the intermediate valley numbers $I_n$. In some embodiments, selecting one or more of the intermediate valley numbers $I_n$ may involve a look-up-table, a counter circuit, a memory circuit, a combinational circuit, a finite-state machine, or another appropriate circuit.

In other embodiments, the valley integer modulator 512 receives the target valley number T via the valley*($n_{int}$, $n_{dec}$)

signal from the target valley generator 514 and selects each intermediate valley number $I_n$ of the series of intermediate valley numbers $I_N$ such that an average of the intermediate valley numbers $I_N$ corresponds to the target valley number T.

The valley integer modulator 512 modulates the off-time of the main switch M1 such that an average off-time of the main switch M1 corresponds to the intermediate valley number $I_n$ for a duration of a modulation period $P_{mod}$. The duration of the modulation period $P_{mod}$ is advantageously selected, in some embodiments, to correspond to a low frequency (e.g., 100-200 Hz) that the human ear is less sensitive to as compared to a higher frequency.

At step 1108, it is determined if the modulation period $P_{mod}$ has expired. If it is determined at step 1108 that the modulation period $P_{mod}$ has not yet expired, flow of the process 1100 returns to step 1106 where modulation of the off-time of the main switch M1 in accordance with the intermediate valley number $I_n$ continues. If it is determined at step 1108 that the modulation period $P_{mod}$ has expired, flow of the process 1100 proceeds to step 1110. At step 1110, a next intermediate valley number $I_{n+offset}$ of the series of intermediate valleys $I_N$ is selected (e.g., by the valley jitter module 413). The next intermediate valley number $I_{n+offset}$ differs from the previous intermediate valley number $I_n$ by a fractional valley number offset ("offset"). That is, the fractional valley number offset determines a difference between the previously selected intermediate valley number $I_n$ and the next intermediate valley number $I_{n+offset}$. In some embodiments, the fractional valley number offset is equal to 0.5. In other embodiments, the fractional valley number offset is equal to 0.25. In yet other embodiments, the fractional valley number offset is equal to another fractional valley (e.g., 0.10, 0.15, 0.20, 0.75, etc.) Flow of the process 1100 then continues back to step 1106 where the next off-time of the main switch M1 is controlled or modulated such that the average off-time of the main switch M1 corresponds to the next selected intermediate valley number $I_{n+offset}$. In some embodiments, the modulation period $P_{mod}$ remains the same for each switching cycle of the main switch M1. In other embodiments, the modulation period $P_{mod}$ may itself be varied.

Figure 12:
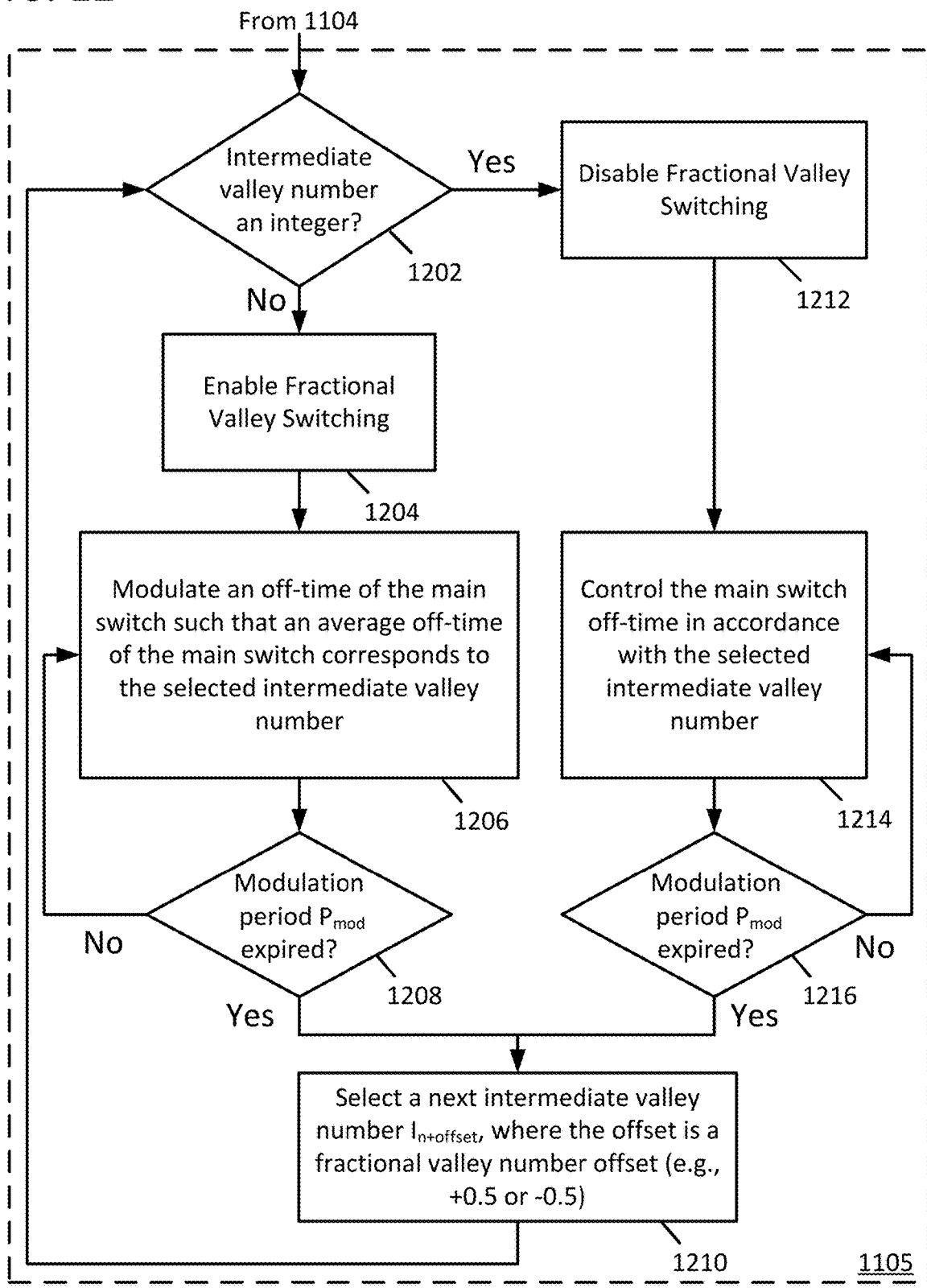
FIG. 12 is a portion of an example process for operation of the power converter shown in FIG. 2, in accordance with some embodiments.

FIG. 12 shows a portion of another example embodiment of block 1105 of the process 1100 for frequency jitter utilizing a fractional valley switching controller, in accordance with some embodiments. The particular steps, order of steps, and combination of steps are shown for illustrative and explanatory purposes only. Other embodiments can implement different particular steps, orders of steps, and combinations of steps to achieve similar functions or results.

Step 1202 of FIG. 12 continues from step 1104 of FIG. 11 as an alternative to step 1106 shown in FIG. 11. At step 1202, it is determined if the selected intermediate valley number is an integer. If it is determined at step 1202 that the selected intermediate valley number is not an integer, flow continues to step 1204. At step 1204, fractional valley switching is enabled (e.g., via the fractional$_{en}$ signal) and then flow continues to step 1206. At step 1206, an off-time of the main switch M1 is modulated such that an average off-time of the main switch M1 corresponds to the selected intermediate valley number (e.g., $I_n$) (i.e., similar to, or the same as, step 1106 of FIG. 11). At step 1208, it is determined if the modulation period $P_{mod}$ has expired. If it is determined at step 1208 that the modulation period $P_{mod}$ has not yet expired, flow returns to step 1206 where modulation of the off-time of the main switch M1 in accordance with the intermediate valley number $I_n$ continues. If it is determined at step 1208 that the modulation period $P_{mod}$ has expired, flow proceeds to step 1210. At step 1210, a next intermediate valley number $I_{n+offset}$ is selected (i.e., similar to, or the same as, step 1110 of FIG. 11). Flow then continues back to step 1202, where it is determined if the next selected intermediate valley number is an integer. If it is determined at step 1202 that the next selected intermediate valley number is an integer, flow continues to step 1212. At step 1212, fractional valley switching is disabled (e.g., using the fractional$_{en}$ signal). At step 1214, the off-time of the main switch is controlled in accordance with the selected intermediate valley number, for example, by repeatedly switching the main switch M1 at the same integer valley number using the first modulator 604 or the first modulator 704. At step 1216, it is determined if the modulation period $P_{mod}$ has expired. If it is determined at step 1216 that the modulation period $P_{mod}$ has not yet expired, flow returns to step 1214 where controlling the off-time of the main switch M1 in accordance with the selected intermediate valley number $I_n$ continues. If it is determined at step 1216 that the modulation period $P_{mod}$ has expired, flow proceeds to step 1210.

Figure 13A:
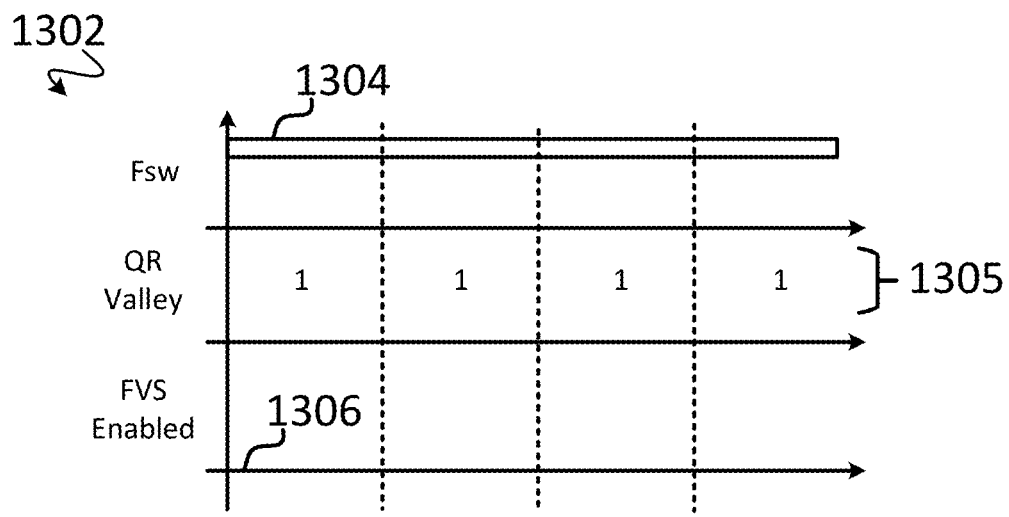
FIGS. 13A-C are simplified plots of signals related to the power converter shown in FIG. 2, in accordance with some embodiments.

FIG. 13A shows a simplified plot 1302 of signals related to operation of the power converter 200. The simplified plot 1302 includes an example switching frequency band Fsw 1304 of the main switch M1, an indication 1305 of a quasi-resonant (QR) valley that the average main switch M1 off-time corresponds to, and a signal FVS Enabled 1306 that indicates whether fractional valley switching is enabled. In the example shown, the switching frequency band Fsw 1304 is constrained to a single frequency band as a result of the power converter 200 repeatedly switching at quasi-resonant valley 1 when fractional valley switching is disabled. As a result, a peak conducted EMI level of the power converter 200 may be in violation of regulatory requirements if appropriate filtering is not implemented for the power converter 200, e.g., using physical filter components such as a differential inductor, filtering capacitors, a common-mode choke, y-capacitors and/or a transformer shield.

Figure 13B:
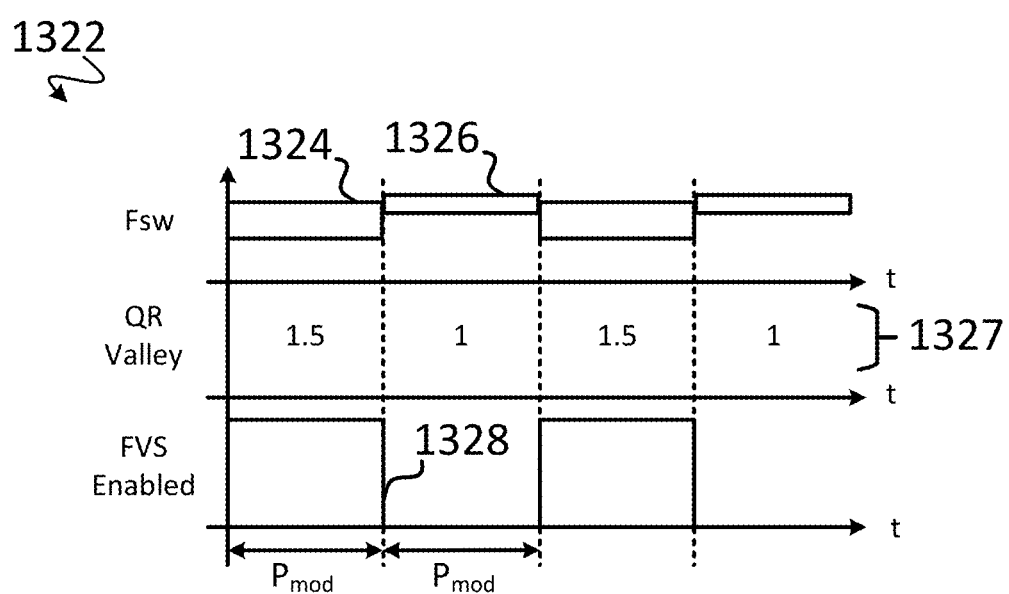

FIG. 13B shows a simplified plot 1322 of signals related to operation of the power converter 200, in accordance with some embodiments. The simplified plot 1322 includes example switching frequency bands Fsw 1324, 1326 of the main switch M1, an indication 1327 of a quasi-resonant (QR) valley that the average main switch M1 off-time corresponds to for each modulation period $P_{mod}$, and a signal FVS Enabled 1328 that indicates whether fractional valley switching is enabled during each modulation period $P_{mod}$. In the example shown, the quasi-resonant valley at which the main switch M1 switches is changed to a different quasi-resonant valley number 1327 (i.e., an intermediate target valley) each modulation period $P_{mod}$. The example modulation sequence shown includes intermediate valley numbers $I_N = \{1.5, 1, 1.5, 1 \ldots ,\}$; thus, the fractional valley number offsets include +0.5 and −0.5 In the embodiment shown, when the quasi-resonant valley number is an integer value, the signal FVS Enabled 1328 is de-asserted. When the quasi-resonant valley number 1327 is a non-integer value, the signal FVS Enabled 1328 is asserted. In such embodiments, the fractional$_{en}$ signal may be asserted and de-asserted in accordance with the FVS Enabled signal 1328. As shown, conducted EMI is averaged across multiple frequency bands as compared to the example shown in FIG. 13A. Thus, a peak conducted EMI is reduced as compared to the example shown in FIG. 13A.

Figure 13C:
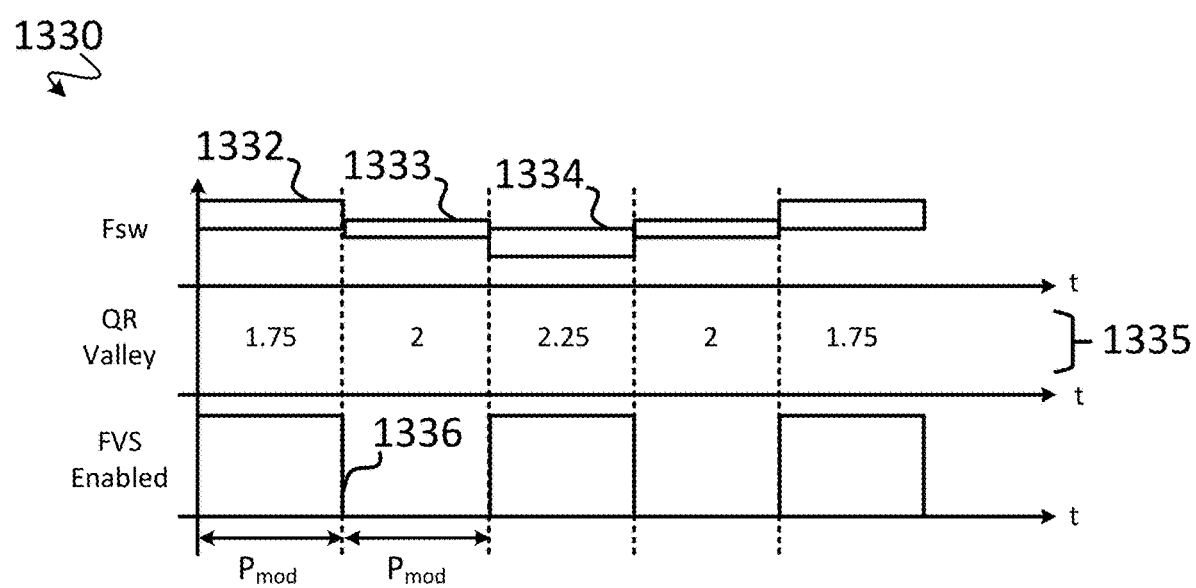

FIG. 13C shows a simplified plot 1330 of signals related to operation of the power converter 200, in accordance with some embodiments. The simplified plot 1330 includes example switching frequency bands Fsw 1332, 1333, 1334 of the main switch M1, an indication 1335 of a quasi-resonant (QR) valley that the average main switch M1 off-time corresponds to for each modulation period $P_{mod}$, and a signal FVS Enabled 1336 that indicates whether fractional valley switching is enabled. In the example shown, the quasi-resonant valley at which the main switch M1 switches is changed to a different quasi-resonant valley number 1335 (i.e., an intermediate target valley) each modulation period $P_{mod}$. The example modulation sequence shown includes intermediate valley numbers $I_N=\{1.75, 2, 2.25, 2, 1.75 \ldots,\}$. In the example shown, the fractional valley number offsets described with respect to FIGS. 10-11 are equal to +0.25 and −0.25. Thus, for a first modulation period $P_{mod}$, the off-time of the main switch M1 is modulated such that the average off-time of the main switch M1 corresponds to intermediate valley number 1.75; for a second modulation period $P_{mod}$, the off-time of the main switch M1 is controlled such that the off-time of the main switch M1 corresponds to intermediate valley number 2; for a third modulation period $P_{mod}$, the off-time of the main switch M1 is modulated such that the average off-time of the main switch M1 corresponds to intermediate valley number 2.25; for a third modulation period $P_{mod}$, the off-time of the main switch M1 is controlled such that the off-time of the main switch M1 corresponds to intermediate valley number 2, and so on. An average of the series of intermediate valley numbers $I_N$ corresponds to a desired off-time of the main switch M1. For example, the average of the series of valley numbers $I_N$ corresponds to the target valley number, valley* ($n_{int}$, $n_{dec}$).

In the embodiment shown, when the quasi-resonant valley number is an integer value, the signal FVS Enabled 1336 is de-asserted. When the quasi-resonant valley number 1335 is a non-integer value, the signal FVS Enabled 1336 is asserted. Because the switching frequency bands Fsw 1332, 1333, 1334 are modulated between multiple regions, a peak conducted EMI of the power converter 200 is thereby further reduced as compared to the examples shown in FIGS. 13A-B.

Figure 14:
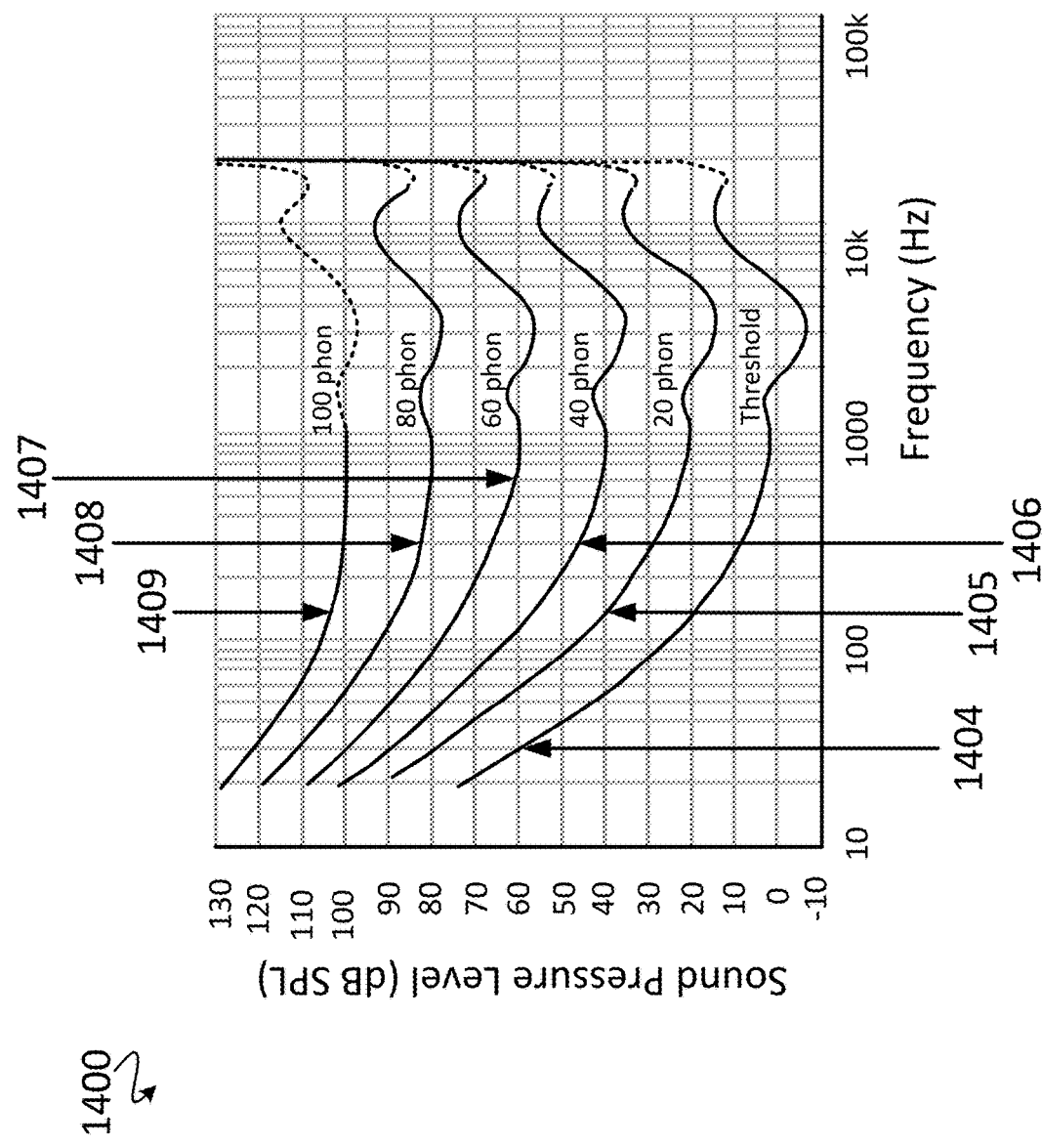
FIG. 14 is a simplified plot of equal loudness curves that demonstrate sensitivity of the human ear to particular audible tones.

As previously disclosed, the duration of the modulation period $P_{mod}$ is advantageously selected, in some embodiments, to correspond to a low frequency that the human ear is less sensitive to as compared to a higher frequency. In some embodiments, the modulation period $P_{mod}$ is about 2.5 ms. In such embodiments a modulation pattern thereby repeats every 5 ms, corresponding to a modulation frequency of about 200 Hz. FIG. 14 provides a plot 1400 of equal loudness curves 1404, 1405, 1406, 1407, 1408, 1409 corresponding to a threshold level, 20 phons, 40 phons, 60 phons, 80 phons, and 100 phons, respectively. The equal loudness curves 1404-1409 are a measure of sound pressure across a frequency spectrum for which a listener perceives a constant loudness when presented with a pure steady tone. As shown, the human ear is less sensitive to an audible frequency of 200 Hz as compared to higher frequencies.

Figure 15:
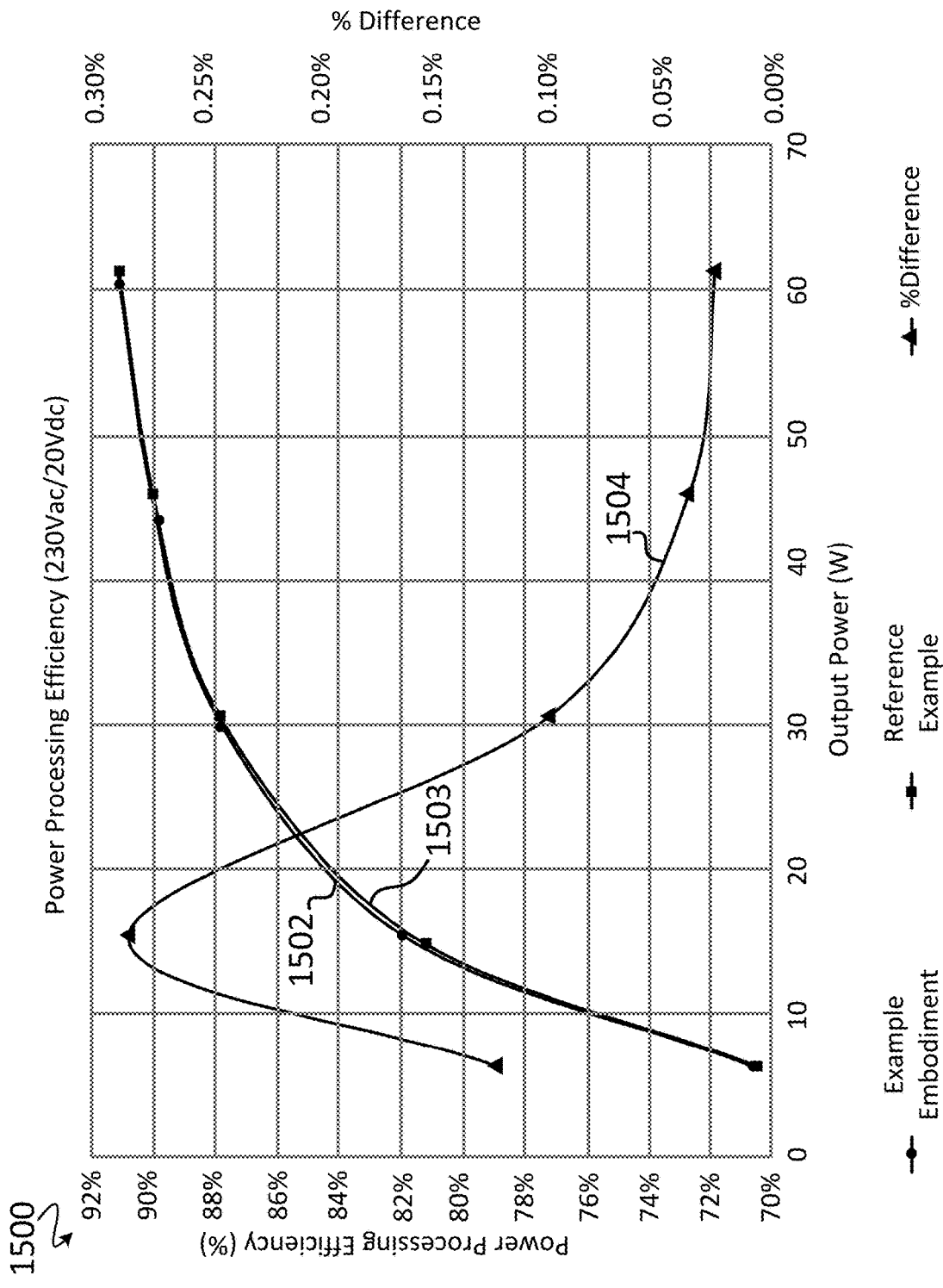
FIG. 15 is a simplified plot of power processing efficiency related to the power converter shown in FIG. 2, in accordance with some embodiments.

An additional advantage of frequency jitter utilizing fractional valley switching, as disclosed herein, is that power processing efficiency is not negatively impacted as compared to conventional approaches. FIG. 15 provides plots 1500 of power processing efficiency curves 1502, 1503, and a percentage difference curve 1504 comparing the power processing efficiency curves 1502 and 1503. The power processing efficiency curve 1502 corresponds to a 60W power converter, similar to the power converter 100 or the power converter 200, operating without frequency jitter using fractional valley switching. The power processing efficiency curve 1503 corresponds to a 60W power converter, similar to the power converter 100 or the power converter 200, performing frequency jitter using fractional valley switching to reduce peak conducted EMI. As shown by the percentage difference curve 1504, frequency jitter using fractional valley switching, as disclosed herein, has little to no impact on power processing efficiency of the power converter 100/200.

FIG. 16 shows screenshots 1602, 1604 of experimental results for a test power converter that is similar to the power converter 200, in accordance with some embodiments. Each of the screenshots 1602, 1604 show time (1602a/1604a) and frequency domain (1602b/1604b) measurements of a drain-source voltage $V_{dsM1}$ of a main switch (e.g., M1) of the test power converter. The screenshot 1602 illustrates the time and frequency domain measurements of $V_{dsM1}$ when frequency jitter using fractional valley switching is not enabled, and the screenshot 1604 illustrates the time and frequency domain measurements of $V_{dsM1}$ when frequency jitter using fractional valley switching is enabled for a 230Vac/20Vdc 1A operating condition of the test power converter. In the example shown, at regions 1612, 1614 of the frequency spectrum 1604b, frequency jitter using fractional valley switching, as disclosed herein, reduces a maximum peak in the frequency spectrum 1604b to 24.77 dB as compared to a maximum peak of 30.7 dB in the frequency spectrum 1602b.

FIG. 17 shows screenshots 1702, 1704 of experimental results for a test power converter that is similar to the power converter 200. The screenshot 1702 provides results of an average EMI scan for a 230Vac/20Vdc 1A operating condition of the test power converter when frequency jitter using fractional valley switching is not enabled. Also shown is a region of interest 1703 that is discussed below. The screenshot 1704 provides results of a quasi-peak EMI scan for a 230Vac/20Vdc 1A operating condition of the test power converter when frequency jitter using fractional valley switching is not enabled.

FIG. 18 shows screenshots 1802, 1804 of experimental results for a test power converter that is similar to the power converter 200, when frequency jitter using fractional valley switching is enabled, in accordance with some embodiments. The screenshot 1802 provides results of an average EMI scan for a 230Vac/20Vdc 1A operating condition of the test power converter when frequency jitter using fractional valley switching is enabled. The screenshot 1804 shows results of a quasi-peak EMI scan for a 230Vac/20Vdc 1A operating condition of the test power converter when frequency jitter using fractional valley switching is enabled. A region of interest 1803 illustrates an average EMI reduction from 2 dB to 7 dB with a maximum reduction for a frequency range that is less than 500 kHz as compared to the region of interest 1703. This reduction of EMI at low frequency advantageously allows a designer to reduce the size of an input filter as compared to an input filter designed for a power converter that does not implement frequency jitter using fractional valley switching, the required size of the input filter being strongly influenced by the less-than 500 kHz frequency spectrum.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
  determining a target number of valleys of a resonant waveform at a drain node of a main switch of a power converter, the target number of valleys corresponding to a desired off-time of the main switch;
  selecting a first intermediate valley number of a plurality of intermediate valley numbers, an average of the plurality of intermediate valley numbers corresponding to the target number of valleys;
  controlling, for a duration of a first modulation period, a first average off-time of the main switch such that the first average off-time of the main switch corresponds to the first intermediate valley number;
  selecting, upon expiration of the first modulation period, a second intermediate valley number of the plurality of intermediate valley numbers, a difference of the second intermediate valley number and the first intermediate valley number being equal to a fractional valley number offset; and
  controlling, for a duration of a second modulation period, a second average off-time of the main switch such that the second average off-time of the main switch corresponds to the second intermediate valley number.

2. The method of claim 1, wherein controlling the first average off-time of the main switch comprises:
  modulating, for the duration of the first modulation period, an off-time of the main switch between a first plurality of off-times, the first plurality of off-times of the main switch having a first average value that corresponds to the first intermediate valley number.

3. The method of claim 2, wherein controlling the second average off-time of the main switch comprises:
  controlling, for the duration of the second modulation period, the off-time of the main switch in accordance with the second intermediate valley number, the second intermediate valley number being an integer.

4. The method of claim 2, wherein:
  each off-time of the first plurality of off-times corresponds to a respective integer valley number of a first plurality of integer valley numbers.

5. The method of claim 4, wherein:
  the first plurality of integer valley numbers comprises a first sequence of one or more first integer valley numbers in series immediately followed by a second sequence of one or more second integer valley numbers in series;
  a length of the first sequence is different than a length of the second sequence; and
  the one or more first integer valley numbers are not equal to the one or more second integer valley numbers.

6. The method of claim 2, wherein controlling the second average off-time of the main switch comprises:
  modulating, for the duration of the second modulation period, an off-time of the main switch between a second plurality of off-times, the second plurality of off-times of the main switch having a second average value that corresponds to the second intermediate valley number.

7. The method of claim 6, wherein:
  each off-time of the first plurality of off-times corresponds to a respective integer valley number of a first plurality of integer valley numbers; and
  each off-time of the second plurality of off-times corresponds to a respective integer valley number of a second plurality of integer valley numbers.

8. The method of claim 7, further comprising:
  generating the first plurality of off-times based on the first intermediate valley number; and
  generating the second plurality of off-times based on the second intermediate valley number.

9. The method of claim 1, further comprising:
  selecting, upon expiration of the second modulation period, a third intermediate valley number of the plurality of intermediate valley numbers, a difference of the third intermediate valley number and the second intermediate valley number being equal to the fractional valley number offset.

10. The method of claim 1, wherein:
  the fractional valley number offset is a non-integer number.

11. The method of claim 10, wherein:
  the fractional valley number offset is about 0.5.

12. The method of claim 10, wherein:
  the fractional valley number offset is about 0.25.

13. The method of claim 1, wherein:
  the duration of each of the first and second modulation periods is about 2.5 ms.

14. The method of claim 1, further comprising:
  measuring an off-time of the main switch;
  determining a difference between the desired off-time of the main switch and the measured off-time of the main switch; and
  generating the target number of valleys based on the determined difference.

15. The method of claim 1, further comprising:
  measuring an off-time of the main switch;
  determining a difference between the measured off-time of the main switch and the desired off-time of the main switch;
  producing an off-time adjustment signal based on the determined difference between the measured off-time of the main switch and the desired off-time of the main switch; and
  generating the target number of valleys based on the off-time adjustment signal.

16. A power converter controller comprising:
  a fractional valley controller configured to determine a target number of valleys of a resonant waveform at a drain node of a main switch of a power converter, the target number of valleys corresponding to a desired off-time of the main switch; and
  a valley jitter module configured to:
  select a first intermediate valley number of a plurality of intermediate valley numbers, an average of the plurality of intermediate valley numbers corresponding to the target number of valleys, the main switch being controlled for a duration of a first modulation period such that a first average off-time of the main switch corresponds to the first intermediate valley number; and select, upon expiration of the first modulation period, a second intermediate valley number of the plurality of intermediate valley numbers, a difference of the second intermediate valley number and the first intermediate valley number being equal to a fractional valley number offset, the main switch being controlled for the duration of a second modulation period such that a second average off-time of the main switch corresponds to the second intermediate valley number.

17. The power converter of claim 16, wherein controlling the first average off-time of the main switch comprises:
modulating, for the duration of the first modulation period, an off-time of the main switch between a first plurality of off-times, the first plurality of off-times of the main switch having a first average value that corresponds to the first intermediate valley number.

18. The power converter of claim 17, wherein controlling the second average off-time of the main switch comprises:
controlling, for the duration of the second modulation period, the off-time of the main switch in accordance with the second intermediate valley number, the second intermediate valley number being an integer.

19. The power converter of claim 17, wherein:
each off-time of the first plurality of off-times corresponds to a respective integer valley number of a first plurality of integer valley numbers.

20. The power converter of claim 19, wherein:
the first plurality of integer valley numbers comprises a first sequence of one or more first integer valley numbers in series immediately followed by a second sequence of one or more second integer valley numbers in series;
a length of the first sequence is different than a length of the second sequence; and
the one or more first integer valley numbers are not equal to the one or more second integer valley numbers.

21. The power converter of claim 17, wherein controlling the second average off-time of the main switch comprises:
modulating, for the duration of the second modulation period, an off-time of the main switch between a second plurality of off-times, the second plurality of off-times of the main switch having a second average value that corresponds to the second intermediate valley number.

22. The power converter of claim 21, wherein:
each off-time of the first plurality of off-times corresponds to a respective integer valley number of a first plurality of integer valley numbers; and
each off-time of the second plurality of off-times corresponds to a respective integer valley number of a second plurality of integer valley numbers.

* * * * *